United States Patent
Takebayashi et al.

(10) Patent No.: US 12,330,504 B2
(45) Date of Patent: Jun. 17, 2025

(54) CONTROL APPARATUS FOR VEHICLE AND COMPUTER-READABLE RECORDING MEDIUM

(71) Applicant: SUBARU CORPORATION, Tokyo (JP)

(72) Inventors: Yosuke Takebayashi, Tokyo (JP); Takeshi Yoneda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 289 days.

(21) Appl. No.: 18/151,072

(22) Filed: Jan. 6, 2023

(65) Prior Publication Data

US 2023/0286393 A1  Sep. 14, 2023

(30) Foreign Application Priority Data

Mar. 10, 2022  (JP) ................. 2022-037433

(51) Int. Cl.
*B60L 15/00* (2006.01)
*B60L 7/18* (2006.01)
*B60L 15/20* (2006.01)

(52) U.S. Cl.
CPC ................. *B60L 15/20* (2013.01); *B60L 7/18* (2013.01)

(58) Field of Classification Search
CPC .... B60L 15/20; B60L 7/18; B60L 3/06; B60L 2220/42; B60L 2260/167; B60L 15/2009; B60L 15/2045; Y02T 10/72
See application file for complete search history.

(56) References Cited

U.S. PATENT DOCUMENTS

| | | | | |
|---|---|---|---|---|
| 11,654,892 B2* | 5/2023 | Oguro | ............ | B60W 30/18172 701/69 |
| 2007/0129873 A1* | 6/2007 | Bernzen | ................ | F02D 41/021 701/96 |
| 2008/0255716 A1* | 10/2008 | Bandai | ................ | B60L 15/2009 701/22 |
| 2010/0121515 A1* | 5/2010 | Izumi | .................. | B60W 10/184 701/22 |
| 2010/0299019 A1* | 11/2010 | Igarashi | ................ | F02D 41/021 701/31.4 |

(Continued)

FOREIGN PATENT DOCUMENTS

JP  2008-167613 A  7/2008

*Primary Examiner* — Peter D Nolan
*Assistant Examiner* — Peter Y Ning
(74) *Attorney, Agent, or Firm* — Rimon P.C.

(57) ABSTRACT

A control apparatus for a vehicle is provided. The vehicle includes driving motors provided for respective wheels. The driving motors each output driving torque for the vehicle and output regenerative torque. The control apparatus includes: one or more processors; and one or more memories communicably coupled to the one or more processors. The processors predict an output increased state ahead in a direction of travel of the vehicle. The output increased state causes output torque of any of the driving motors to be larger than a rated output. On the condition that the output increased state is predicted, the processors limit the driving torque and the regenerative torque of a relevant one of the driving motors expected to produce an output larger than the rated output in the output increased state, to under the rated output, until the output increased state occurs.

13 Claims, 9 Drawing Sheets

(56) References Cited

U.S. PATENT DOCUMENTS

| | | | | |
|---|---|---|---|---|
| 2011/0118920 A1* | 5/2011 | Kim | ........................ | B60W 20/11 |
| | | | | 701/22 |
| 2011/0307154 A1* | 12/2011 | Takeda | .................... | B60T 7/122 |
| | | | | 701/70 |
| 2015/0006001 A1* | 1/2015 | Kawata | ............... | B60L 15/2045 |
| | | | | 180/65.265 |
| 2015/0291148 A1* | 10/2015 | Sakai | .................. | B60W 10/184 |
| | | | | 701/22 |
| 2017/0253144 A1* | 9/2017 | Arima | .................... | B60L 15/007 |
| 2020/0070836 A1* | 3/2020 | Suzuki | .................... | B60L 15/20 |
| 2022/0041069 A1* | 2/2022 | Layfield | .................... | B60L 7/10 |
| 2023/0347748 A1* | 11/2023 | Kurosawa | ............. | B60W 20/14 |

\* cited by examiner

CONTROL APPARATUS FOR VEHICLE AND COMPUTER-READABLE RECORDING MEDIUM

CROSS-REFERENCE TO RELATED APPLICATIONS

The present application claims priority from Japanese Patent Application No. 2022-037433 filed on Mar. 10, 2022, the entire contents of which are hereby incorporated by reference.

BACKGROUND

The disclosure relates to a control apparatus for a vehicle and a computer-readable recording medium containing a computer program.

Vehicles use driving motors as driving sources. Driving motors each have predetermined rated output torque at which a driving motor is able to output stable torque continuously. In a case where a driving motor is in continuous operation at output torque exceeding the rated output torque, a temperature of the driving motor becomes higher, resulting in possibility of lowered performance of the driving motor. Thus, Japanese Unexamined Patent Application Publication (JP-A) No. 2008-167613 makes a proposal for an electric vehicle that makes a regenerative power generation control of an electric generator during downhill-road travel of the electric vehicle. The regenerative power generation control makes it possible for the electric vehicle to exhibit sufficient motive power performance during flat-road travel or uphill-road travel subsequent to the downhill-road travel.

In one example, JP-A No. 2008-167613 describes an electric vehicle that controls distribution of an output of a total braking force to a hydraulic brake and a regenerative brake by a motor generator. Thus, the electric vehicle allows an absolute value of regenerative torque during the downhill-road travel to be smaller than that during the flat-road travel, with respect to the same braking operation. The electric vehicle in JP-A No. 2008-167613 is configured to suppress a regenerative braking force during the downhill-road travel, and prevent a temperature rise in the driving motor. This makes it possible to exhibit sufficient motive power performance during the flat-road travel or the uphill-road travel immediately after the downhill-road travel.

SUMMARY

An aspect of the disclosure provides a control apparatus for a vehicle. The vehicle includes driving motors provided for respective wheels different from one another. The driving motors are each configured to output driving torque for the vehicle and output regenerative torque. The control apparatus includes: one or more processors; and one or more memories communicably coupled to the one or more processors. The one or more processors are configured to predict an output increased state ahead in a direction of travel of the vehicle. The output increased state causes output torque of any of the driving motors to be larger than a rated output. On the condition that the output increased state is predicted, the one or more processors are configured to limit the driving torque and the regenerative torque of a relevant one of the driving motors expected to produce an output larger than the rated output in the output increased state, to under the rated output, until the output increased state occurs.

An aspect of the disclosure provides a computer-readable recording medium containing a program applicable to a control apparatus for a vehicle. The vehicle includes driving motors provided for respective wheels different from one another. The driving motors are each configured to output driving torque for the vehicle and output regenerative torque. The program causes, when executed by one or more processors, the one or more processors to implement processing. The processing includes: predicting an output increased state ahead in a direction of travel of the vehicle, in which the output increased state causes output torque of any of the driving motors to be larger than a rated output; and on the condition that the output increased state is predicted, limiting the driving torque and the regenerative torque of a relevant one of the driving motors expected to produce an output larger than the rated output in the output increased state, to under the rated output, until the output increased state occurs.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
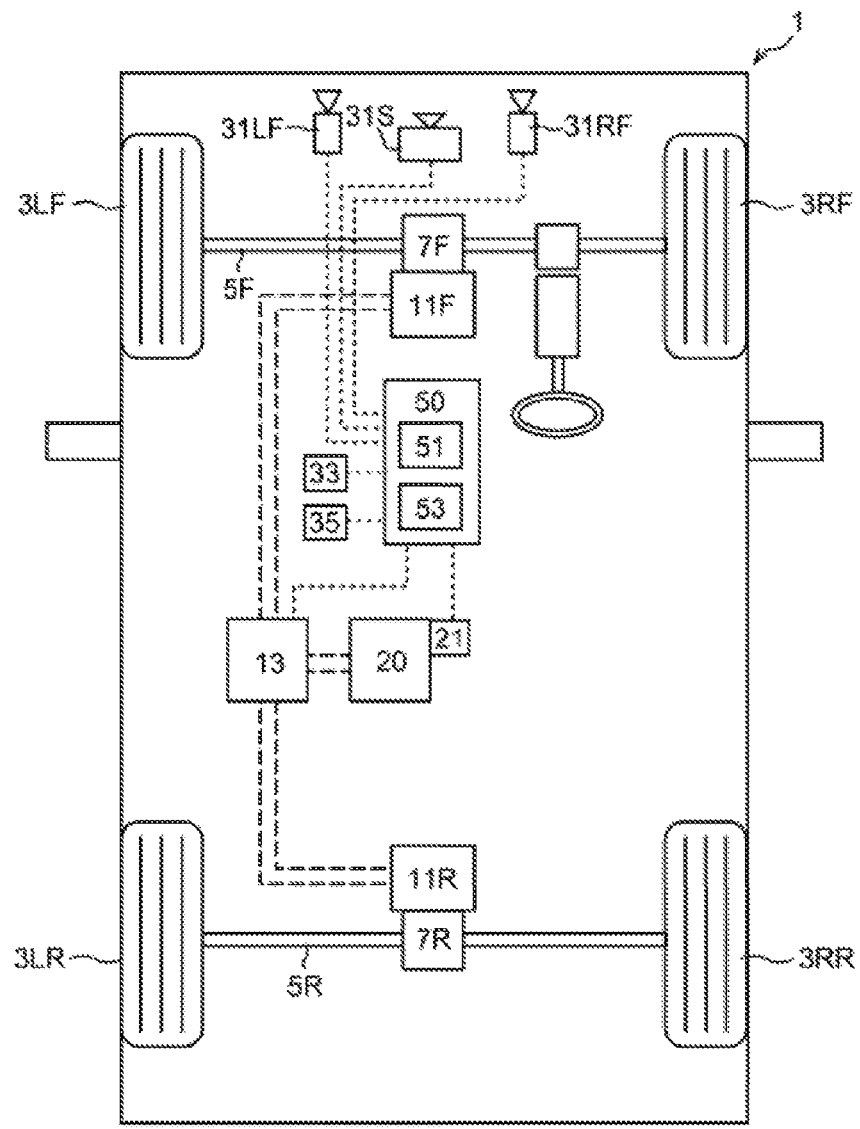
FIG. 1 is a schematic diagram that illustrates a configuration example of a vehicle to which a control apparatus for a vehicle according to one embodiment of the disclosure is applicable.

An electric vehicle described in JP-A No. 2008-167613 limits a regenerative braking force, resulting in possibility of lowered regeneration efficiency. Moreover, a driving motor generates heat not only during regeneration but also in driving. This influences output performance in driving and during the regeneration. In electric vehicles, a driving motor has to output torque corresponding to requested driving torque. Accordingly, what is desired for electric vehicles is to suppress a temperature rise in the driving motor in a case where the requested driving torque is large, and to maintain performance of the driving motor.

It is desirable to provide a control apparatus for a vehicle and a computer-readable recording medium that make it possible to suppress a temperature rise in a driving motor without lowering an output of driving torque and lowering regeneration efficiency.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. First Embodiment 1-1. Configuration Example of Vehicle

Description is given first of an example of an overall configuration of a vehicle to which a control apparatus for a vehicle according to a first embodiment of the disclosure is applicable.

FIG. 1 is a schematic diagram that illustrates a configuration example of a vehicle 1 including a control apparatus 50 for a vehicle according to this embodiment. The vehicle 1 illustrated in FIG. 1 may include a four-wheeled vehicle including a left front wheel 3LF, a right front wheel 3RF, a left rear wheel 3LR, and a right rear wheel 3RR. In the following, the left front wheel 3LF and the right front wheel 3RF are sometimes collectively referred to as "front wheels 3F", and the left rear wheel 3LR and the right rear wheel 3RR are sometimes collectively referred to as "rear wheels 3R". The vehicle 1 may include a front wheel driving motor 11F and a rear wheel driving motor 11R as driving force sources that generate driving torque for the vehicle 1. The front wheel driving motor 11F and the rear wheel driving motor 11R are configured to drive the front wheels 3F and the rear wheels 3R independently from each other.

The front wheel driving motor 11F and the rear wheel driving motor 11R may include, for example, a three-phase AC radial motor or a three-phase AC axial gap motor. However, there is no particular limitation on the number of phases. The front wheel driving motor 11F outputs driving torque to be transmitted to the left and right front wheels 3F through a differential mechanism 7F and a front wheel drive shaft 5F. The rear wheel driving motor 11R outputs driving torque to be transmitted to the left and right rear wheels 3R through a differential mechanism 7R and a rear wheel drive shaft 5R. Moreover, during deceleration of the vehicle 1, the front wheel driving motor 11F and the rear wheel driving motor 11R are configured to perform regenerative power generation by receiving rotational torque of the front wheels 3F or the rear wheels 3R transmitted through the front wheel drive shaft 5F or the rear wheel drive shaft 5R. Driving and regeneration of the front wheel driving motor 11F and the rear wheel driving motor 11R are controlled by the control apparatus 50.

The front wheel driving motor 11F and the rear wheel driving motor 11R each have predetermined rated output torque. The rated output torque means output torque at which the front wheel driving motor 11F or the rear wheel driving motor 11R is able to output stable torque continuously. The rated output torque of the front wheel driving motor 11F and the rated output torque of the rear wheel driving motor 11R may be the same, or alternatively, they may be different.

The vehicle 1 may include an inverter unit 13, a battery 20, and the control apparatus 50 as a system that drives the front wheel driving motor 11F and the rear wheel driving motor 11R. The battery 20 includes a chargeable and dischargeable secondary battery. The battery 20 may include, for example, a lithium-ion battery of a rated voltage of 200 V. However, there is no particular limitation on the rated voltage or the kind of the battery 20. The battery 20 is coupled to the front wheel driving motor 11F and the rear wheel driving motor 11R through the inverter unit 13, and accumulates electric power to be supplied to the front wheel driving motor 11F and the rear wheel driving motor 11R. The battery 20 includes a battery manager device 21. The battery manager device 21 is configured to detect, for example, an open voltage, an output voltage, and a battery temperature of the battery 20, and transmit the open voltage, the output voltage, and the battery temperature to the control apparatus 50.

The inverter unit 13 may include a first inverter circuit and a second inverter circuit. The first inverter circuit controls the driving of the front wheel driving motor 11F. The second inverter circuit controls the driving of the rear wheel driving motor 11R. The first inverter circuit converts DC power swept from the battery 20 into three-phase AC power and supplies the resultant power to a stator of the front wheel driving motor 11F. Moreover, the first inverter circuit converts three-phase AC power regenerated by the front wheel driving motor 11F into DC power, and charges the battery 20. Similarly, the second inverter circuit converts DC power swept from the battery 20 into three-phase AC power and supplies the resultant power to a stator of the rear wheel driving motor 11R. Moreover, the second inverter circuit converts three-phase AC power regenerated by the rear wheel driving motor 11R into DC power, and charges the battery 20. Driving of the inverter unit 13 is controlled by the control apparatus 50.

It is to be noted that a converter circuit that boosts a voltage may be provided between the battery 20 and the inverter circuit.

The control apparatus 50 may serve as an apparatus that controls the driving of the front wheel driving motor 11F and the rear wheel driving motor 11R by allowing one or more processors to execute a computer program. The computer program is a computer program that causes the processors to perform operation described later to be performed by the control apparatus 50. The computer program to be executed by the processors may be contained in a recording medium serving as a storage 53 (memory) provided in the control apparatus 50. Alternatively, the computer program to be executed by the processors may be contained in a recording medium built in the control apparatus 50, or any recording medium externally attachable to the control apparatus 50.

The recording medium containing the computer program may be: a magnetic medium such as a hard disk, a floppy disk, and a magnetic tape; an optical recording medium such as a CD-ROM (Compact Disk Read Only Memory), a DVD (Digital Versatile Disk), an SSD (Solid State Drive), and a Blu-ray (registered trademark); a magnetic-optical medium such as a floptical disk; a storage element such as a RAM (Random Access Memory) and a ROM (Read Only Memory); and a flash memory such as a USB (Universal Serial Bus) memory; or any other medium that is able to hold programs.

To the control apparatus 50, a surrounding environment sensor 31, a vehicle state sensor 33, and a GNSS (Global Navigation Satellite System) sensor 35 are coupled through a dedicated line, or a communication system such as CAN (Controller Area Network) or LIN (Local Inter Net). Moreover, to the control apparatus 50, the inverter unit 13 is coupled through a dedicated line, or the communication system such as CAN or LIN. A configuration of the control apparatus 50 is described in detail later.

The surrounding environment sensor 31 is configured to detect surrounding environment of the vehicle 1. In this embodiment, the surrounding environment sensor 31 is configured to detect, at least, a road shape ahead of the vehicle 1. In this embodiment, the vehicle 1 includes forward view capturing cameras 31LF and 31RF, and LiDAR (Light Detection And Ranging) 31S, as the surrounding environment sensor 31.

The forward view capturing cameras 31LF and 31RF capture a forward view of the vehicle 1 and generate image data. The forward view capturing cameras 31LF and 31RF include imaging elements such as CCD (Charged-Coupled Devices) or CMOS (Complementary Metal-Oxide-Semiconductor), and transmit the generated image data to the control apparatus 50. In the vehicle 1 illustrated in FIG. 1, the forward view capturing cameras 31LF and 31RF constitute a stereo camera including a pair of left and right cameras. However, the forward view capturing cameras 31LF and 31RF may each be a monocular camera. In addition to the forward view capturing cameras 31LF and 31RF, the vehicle 1 may include, for example, a rearward view capturing camera. The rearward view capturing camera is provided in a rear part of the vehicle 1 and captures a rearward view.

The LiDAR 31S transmits optical waves and receives reflected waves of the optical waves, and detects an obstacle, a distance to the obstacle, and a position of the obstacle on the basis of time from the transmission of the optical waves to the reception of the reflected waves. The LiDAR 31S transmits detection data to the control apparatus 50. In place of the LiDAR 31S, or together with the LiDAR 31S, the vehicle 1 may include any one or more sensors out of a radar sensor such as millimeter wave radar, and an ultrasonic sensor, as the surrounding environment sensor that acquires data regarding the surrounding environment.

The vehicle state sensor 33 includes one or more sensors that detect an operation state and behavior of the vehicle 1. The vehicle state sensor 33 includes, for example, one or more of a steering angle sensor, an accelerator position sensor, a brake stroke sensor, a brake pressure sensor, and an engine speed sensor, and detects the operation state of the vehicle 1 such as a steering angle of a steering wheel or a steering wheel, an accelerator position, an amount of a brake operation, or an engine speed. Moreover, the vehicle state sensor 33 includes, for example, one or more of a vehicle speed sensor, an acceleration rate sensor, and an angular speed sensor, and detects the behavior of the vehicle such as a vehicle speed, a longitudinal acceleration rate, a lateral acceleration rate, and a yaw rate. The vehicle state sensor 33 transmits a sensor signal including the detected data, to the control apparatus 50.

The GNSS sensor 35 receives satellite signals transmitted from multiple satellites and detects a position of the GNSS sensor 35, that is, a position of the vehicle 1. The GNSS sensor 35 transmits detected positional data regarding the vehicle 1 to the control apparatus 50.

1-2. Control Apparatus

Next, the control apparatus 50 for the vehicle according to this embodiment is described in detail.

1-2-1. Configuration Example

Figure 2:
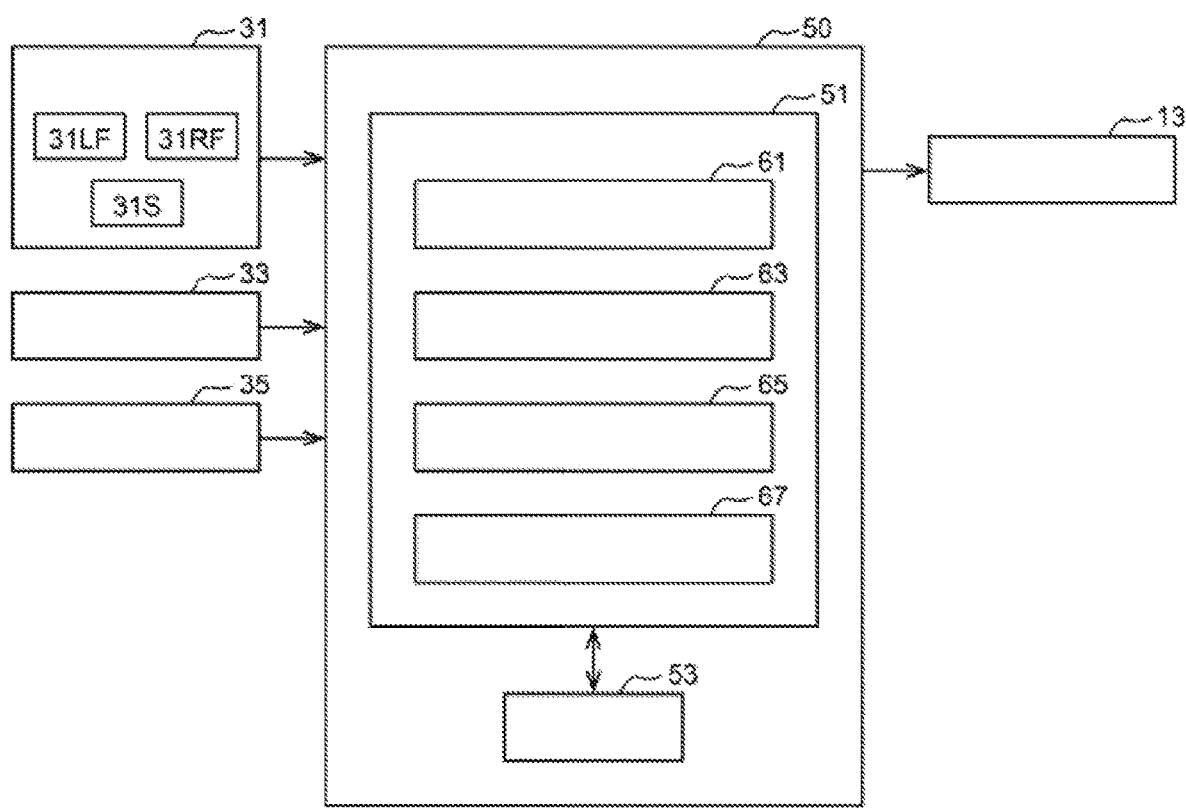
FIG. 2 is a block diagram that illustrates a configuration example of the control apparatus for the vehicle according to the embodiment.

FIG. 2 is a block diagram illustrating a configuration example of the control apparatus 50.

The control apparatus 50 includes a processor 51 and the storage 53. The processor 51 includes one or more processors such as a CPU (Central Processing Unit). A portion or all of the processor 51 may include an updatable one such as firmware, or may be, for example, a program module to be executed in accordance with a command from, for example, a CPU. The storage 53 includes a memory such as a RAM or a ROM. However, there is no particular limitation on the number of the storages 53 and the kind of the storage 53. The storage 53 holds a computer program to be executed by the processor 51, and data to be used in calculation processing, e.g., various parameters, detection data, and calculation results.

1-2-2. Configuration of Processor

The processor 51 of the control apparatus 50 includes a surrounding environment detection unit 61, an output increase prediction unit 63, an output limiting unit 65, and a motor control unit 67. These units may each be realized by execution of a computer program by a processor such as a CPU. However, some of these units may include an analog circuit. In the following, after brief description of each unit of the processor 51, processing operation is described in detail.

(Surrounding Environment Detection Unit)

The surrounding environment detection unit 61 detects the surrounding environment of the vehicle 1 on the basis of the detection data transmitted from the surrounding environment sensor 31. In one example, the surrounding environment detection unit 61 calculates a kind, a size (width, height, and depth), a position, and a speed of an obstacle present around the vehicle 1, a distance from the vehicle 1 to the obstacle, and a relative speed between the vehicle 1 and the obstacle. The obstacle to be detected includes a random vehicle traveling, a parked vehicle, pedestrians, bicycles, sidewalls, curb stones, buildings, utility poles, traffic signs, traffic lights, natural objects, and any other objects present around the vehicle 1. In this embodiment, the surrounding environment detection unit 61 acquires, at least, road shape data, i.e., data regarding the road shape ahead of the vehicle 1. The road shape data may include, for example, data regarding a gradient of a road and a radius of curvature of a curve.

The surrounding environment detection unit 61 may refer to high-precision map data and acquire the road shape data ahead in a direction of travel of the vehicle 1 on the basis of the positional data regarding the vehicle 1. In one example, the surrounding environment detection unit 61 identifies the position and the direction of travel of the vehicle 1 on the high-precision map data on the basis of the positional data regarding the vehicle 1 transmitted from the GNSS sensor 35, and acquires the road shape data ahead in the direction of travel of the vehicle 1. The high-precision map data is held in association with the data regarding the gradient and the radius of curvature of the road, and the surrounding environment detection unit 61 acquires these pieces of the road shape data.

(Output Increase Prediction Unit)

The output increase prediction unit 63 predicts an output increased state. The output increased state causes the output torque of one or both of the front wheel driving motor 11F and the rear wheel driving motor 11R to increase to the rated output or larger ahead in the direction of travel of the vehicle 1. In one example, the output increase prediction unit 63 predicts the output increased state on the basis of the road shape data ahead in the direction of travel of the vehicle 1 acquired by the surrounding environment detection unit 61. The output increased state causes the output torque of one or both of the front wheel driving motor 11F and the rear wheel driving motor 11R to increase to the rated output or larger. For example, in a case with an uphill road ahead in the direction of travel of the vehicle 1, the output increase prediction unit 63 predicts the output increased state that causes the driving torque of the rear wheel driving motor 11R to become equal to or larger than the rated output. In this case, the output increase prediction unit 63 may predict the output increased state on the basis of a gradient of the uphill road and the vehicle speed. Alternatively, the output increase prediction unit 63 may predict the output increased state on the basis of a calculation result of target driving torque of each of the front wheel driving motor 11F and the rear wheel driving motor 11R.

(Output Limiting Unit)

In the case where the output increased state is predicted by the output increase prediction unit 63, the output limiting unit 65 limits the driving torque and regenerative torque of the relevant one of the front wheel driving motor 11F and the rear wheel driving motor 11R expected to produce an output equal to or larger than the rated output in the output increased state, to the rated output or smaller, until the output increased state occurs. In the case with the uphill road mentioned above, when the output increased state is predicted that causes the target driving torque of the rear wheel driving motor 11R to become equal to or larger than the rated output, the output limiting unit 65 provides setting to limit the driving torque and the regenerative torque of the rear wheel driving motor 11R to the rated output or smaller until an arrival at the uphill road. This makes it possible to suppress a temperature rise in the rear wheel driving motor 11R until the arrival of the vehicle 1 at the uphill road. Hence, it is possible to lower a peak of a temperature of the rear wheel driving motor 11R during travel along the uphill road.

For example, the output limiting unit 65 provides setting to change a distribution ratio of target torque for the entire vehicle 1 between the front wheel driving motor 11F and the rear wheel driving motor 11R, from a basic ratio used in a normal mode in which the output is not limited. Thus, the output limiting unit 65 limits the driving torque and the regenerative torque of the rear wheel driving motor 11R to the rated output or smaller. Moreover, in limiting the driving torque and the regenerative torque of the rear wheel driving motor 11R to the rated output or smaller, the output limiting unit 65 may set upper limit values of the driving torque and the regenerative torque in accordance with the gradient of the uphill road. That is, as estimated driving torque during the uphill-road travel of the vehicle 1 becomes larger, the output limiting unit 65 limits an upper limit of the output of the rear wheel driving motor 11R until the arrival at the uphill road. This leads to suppression of the temperature rise in the rear wheel driving motor 11R.

(Motor Control Unit)

The motor control unit 67 controls the driving and the regeneration of the front wheel driving motor 11F and the rear wheel driving motor 11R. The motor control unit 67 controls the driving and the regeneration of the front wheel driving motor 11F and the rear wheel driving motor 11R in the normal mode while the driving torque and the regenerative torque of the front wheel driving motor 11F and the rear wheel driving motor 11R are not limited by the output limiting unit 65.

In one example, the motor control unit 67 sets the target driving torque of each of the front wheel driving motor 11F and the rear wheel driving motor 11R on the basis of the requested driving torque for the vehicle 1. The motor control unit 67 controls operation of the switching elements provided in the first inverter circuit and the second inverter circuit of the inverter unit 13, to allow the front wheel driving motor 11F and the rear wheel driving motor 11R to output the driving torque. During manual driving, the requested driving torque is calculated on the basis of an amount of operation of an accelerator pedal. During automated driving, the requested driving torque is calculated on the basis of a requested acceleration rate obtained by calculation.

At this occasion, the motor control unit 67 sets, for example, a ratio between the target driving torque of the front wheel driving motor 11F and the target driving torque of the rear wheel driving motor 11R to a preset basic ratio. The basic ratio is set to, for example, a range of 4:6 to 6:4 both inclusive, depending on desired traveling performance. Moreover, in a case where the vehicle 1 travels along an uphill road, the motor control unit 67 raises a ratio of the target driving torque of the rear wheel driving motor 11R because a larger load of vehicle weight is applied to the rear wheels 3R. For example, as the gradient of the uphill road is larger, the motor control unit 67 sets the ratio of the target driving torque of the rear wheel driving motor 11R to a larger value.

Furthermore, the motor control unit 67 sets target regenerative torque of each of the front wheel driving motor 11F and the rear wheel driving motor 11R on the basis of requested braking torque of the vehicle 1. The motor control unit 67 controls the operation of the switching elements provided in the first inverter circuit and the second inverter circuit of the inverter unit 13, to control power generation by the front wheel driving motor 11F and the rear wheel driving motor 11R to generate the regenerative torque. During the manual driving, the requested braking torque is calculated on the basis of an amount of operation of a brake pedal. During the automated driving, the requested braking torque is calculated on the basis of a requested deceleration rate obtained by calculation.

At this occasion, the motor control unit 67 sets, for example, a ratio of the target regenerative torque of the front wheel driving motor 11F and the target regenerative torque of the rear wheel driving motor 11R to a preset basic ratio. The basic ratio is set to, for example, 5:5. Moreover, as the requested braking torque is larger, the motor control unit 67 raises a ratio of the target regenerative torque of the front wheel driving motor 11F because a larger load of the vehicle weight is applied to the front wheels 3F. Similarly, when the vehicle 1 decelerates while traveling along a downhill road, the control apparatus 50 raises the ratio of the target regenerative torque of the front wheel driving motor 11F because a larger load of the vehicle weight is applied to the front wheels 3F. For example, as the gradient of the downhill road is larger, the motor control unit 67 sets the ratio of the target regenerative torque of the front wheel driving motor 11F to a larger value.

Furthermore, the motor control unit 67 controls the driving and the regeneration of the front wheel driving motor 11F and the rear wheel driving motor 11R in an output limited mode while the driving torque and the regenerative torque of the front wheel driving motor 11F or the rear wheel driving motor 11R are limited by the output limiting unit 65. In one example, the motor control unit 67 sets the upper limit of the target driving torque or the target regenerative torque of the front wheel driving motor 11F or the rear wheel driving motor 11R subject to output limitation, to the rated output torque or smaller. In a case where the target driving torque or the target regenerative torque of the relevant motor subject to the output limitation obtained by a calculation method in the normal mode exceeds the rated output, the motor control unit 67 allocates excessive torque to the other motor.

The motor control unit 67 controls the driving of the inverter unit 13 on the basis of the driving torque and the regenerative torque of the front wheel driving motor 11F or the rear wheel driving motor 11R calculated in each of the normal mode and the output limited mode. Thus, the motor control unit 67 controls the driving or the regeneration of the front wheel driving motor 11F or the rear wheel driving motor 11R.

1-3. Processing Operation Example

Heretofore, a configuration example of the control apparatus 50 for the vehicle according to this embodiment is described. Next, an example of processing operation by the control apparatus 50 for the vehicle is described with reference to a flowchart.

Figure 3:
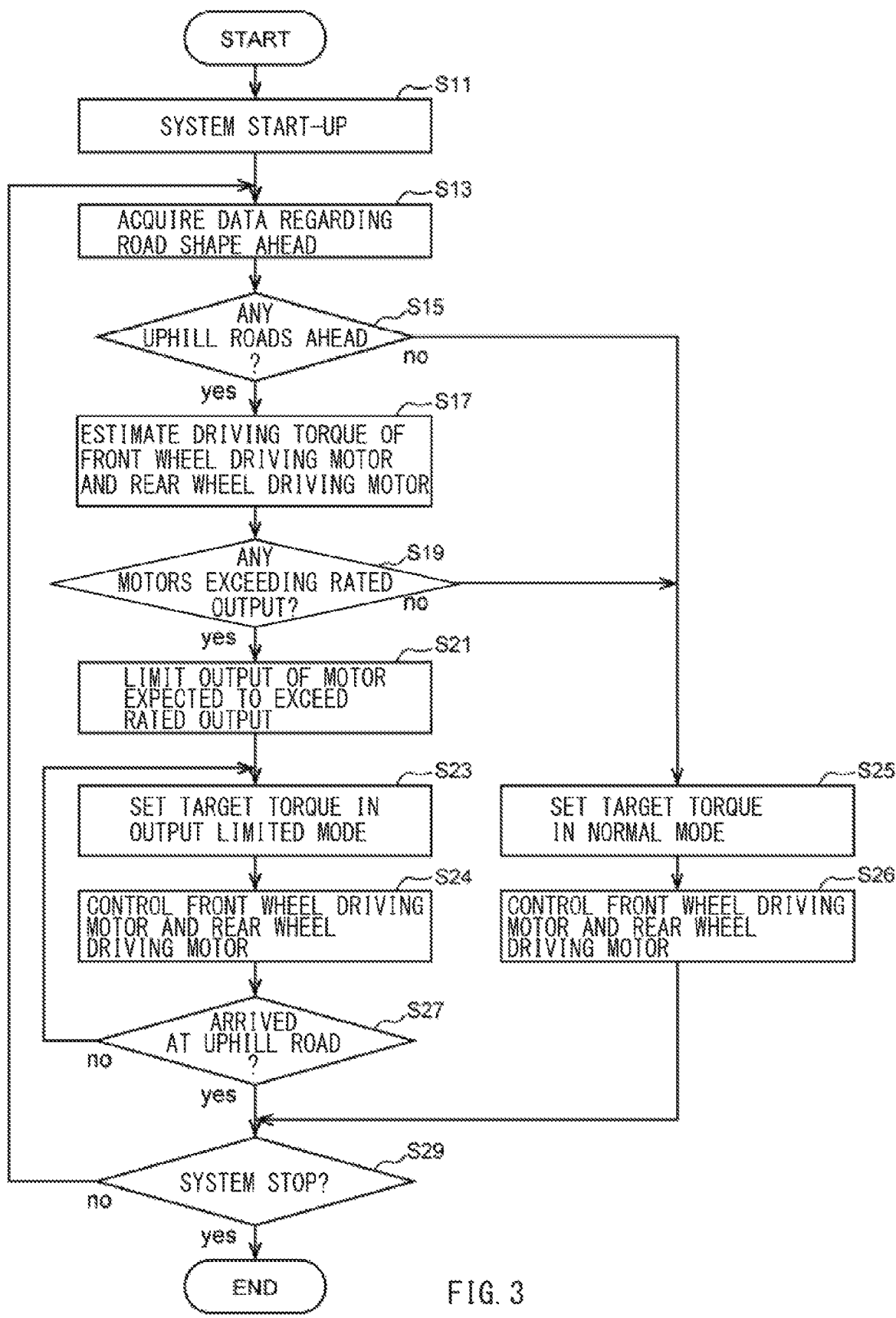
FIG. 3 is a flowchart of an operation example of the control apparatus for the vehicle according to the embodiment.

FIG. 3 is a flowchart illustrating control processing operation of the front wheel driving motor 11F and the rear wheel driving motor 11R by the control apparatus 50 for the vehicle according to this embodiment. In the following description, an example is given in which an uphill road is present ahead in the direction of travel of the vehicle 1, and the output of the rear wheel driving motor 11R is limited before the vehicle 1 travels along the uphill road.

First, upon a start-up of a driving system of the vehicle 1 (step S11), the processor 51 acquires the road shape data ahead in the direction of travel of the vehicle 1 (step S13). In one example, the surrounding environment detection unit 61 detects objects of measurement that allow for recognition of the road shape, e.g., lane lines, curb stones, or guardrails of a road ahead, on the basis of the detection data transmitted from the forward view capturing cameras 31LF and 31RF, and the LiDAR 31S. The surrounding environment detection unit 61 calculates distances to locations of the objects of measurement that allow for the recognition of the road shape present in a range of measurement of the surrounding environment sensor 31. The surrounding environment detection unit 61 calculates the gradient of the relevant road on the basis of data regarding the calculated distances to the locations.

The surrounding environment detection unit 61 may identify the position and the direction of travel of the vehicle 1 on the high-precision map data on the basis of the positional data regarding the vehicle 1 transmitted from the GNSS sensor 35, and obtain the gradient of the road ahead in the direction of travel of the vehicle 1. The high-precision map data may be held in the storage 53, or alternatively, the high-precision map data may be held in an external server configured to be coupled through wireless communication.

Thereafter, the output increase prediction unit 63 determines presence or absence of any uphill roads ahead in the direction of travel of the vehicle 1 (step S15). In one example, the output increase prediction unit 63 determines whether or not an uphill road exceeding a predetermined gradient continues for a predetermined distance or more, on the basis of the road shape data acquired in step S13. The predetermined gradient is set to determine a state in which the requested driving torque increases during the travel along an uphill road. The predetermined gradient may be set to any value within a range of, for example, 30% to 45% both inclusive. The predetermined distance may be set in accordance with magnitude of the gradient. For example, as the gradient is larger, the predetermined distance may be set to a shorter distance.

In a case without a determination as to the presence of any uphill roads ahead (S15/No), the motor control unit 67 does not limit the outputs of the front wheel driving motor 11F and the rear wheel driving motor 11R, but sets the target torque of each of the front wheel driving motor 11F and the rear wheel driving motor 11R in the normal mode (step S25). In one example, the motor control unit 67 sets the target torque for the entire vehicle 1 on the basis of data regarding the vehicle speed, the amount of operation of the accelerator pedal, and the amount of operation of the brake pedal transmitted from the vehicle state sensor 33. Moreover, the motor control unit 67 distributes the relevant target torque to the front wheel driving motor 11F and the rear wheel driving motor 11R, and sets the target torque of each of the front wheel driving motor 11F and the rear wheel driving motor 11R.

In a case where the accelerator pedal is being stepped on, the target driving torque is set on the basis of the amount of operation of the accelerator pedal and the vehicle speed. Thus, the target driving torque of each of the front wheel driving motor 11F and the rear wheel driving motor 11R is set. In a case where the accelerator pedal is suddenly released, or in a case where the brake pedal is being stepped on, the target regenerative torque is set on the basis of a speed at which the accelerator pedal is returned, or the amount of operation of the brake pedal. Thus, the target regenerative torque of each of the front wheel driving motor 11F and the rear wheel driving motor 11R is set. Depending on traveling conditions, the target driving torque or the target regenerative torque of each of the front wheel driving motor 11F and the rear wheel driving motor 11R set in the normal mode may possibly exceed the rated output torque of the front wheel driving motor 11F and the rear wheel driving motor 11R.

Thereafter, the motor control unit 67 controls the driving or the regeneration of the front wheel driving motor 11F and the rear wheel driving motor 11R on the basis of the set target driving torque or the set target regenerative torque (step S26). In one example, the motor control unit 67 controls the driving of the first inverter circuit and the second inverter circuit of the inverter unit 13 on the basis of the target driving torque or the target regenerative torque, and allows the front wheel driving motor 11F and the rear wheel driving motor 11R to output the driving torque or the regenerative torque.

Meanwhile, in step S15, in a case with the determination as to the presence of an uphill road ahead (S15/Yes), the output increase prediction unit 63 estimates the driving torque of each of the front wheel driving motor 11F and the rear wheel driving motor 11R during the travel along the uphill road (step S17). For example, the output increase prediction unit 63 predicts an accelerator operation by a driver on the assumption that the current vehicle speed of the vehicle 1 detected by the vehicle state sensor 33 is maintained, and estimates the driving torque for the vehicle 1. Moreover, the output increase prediction unit 63 calculates driving torque obtained by distributing the driving torque estimated for the vehicle 1 to the front wheel driving motor 11F and the rear wheel driving motor 11R in accordance with setting of the normal mode (hereinafter, also referred to as "estimated driving torque").

Thereafter, the output increase prediction unit 63 determines presence or absence of any motors having the estimated driving torque equal to or larger than the rated output torque (step S19). The rated output torque of the front wheel driving motor 11F and the rear wheel driving motor 11R is grasped from data regarding the specifications and held in the storage 53 in advance. The output increase prediction unit 63 compares the estimated driving torque of each of the front wheel driving motor 11F and the rear wheel driving motor 11R with the rated output torque, and determines whether or not the estimated driving torque of one or both of the front wheel driving motor 11F and the rear wheel driving motor 11R is equal to or larger than the rated output torque. In a case where the vehicle 1 is going to travel along an uphill road, a determination may be made as to whether or not the estimated driving torque of the rear wheel driving motor 11R is equal to or larger than the rated output torque.

In a case without a determination as to the presence of any motors having the estimated driving torque equal to or larger than the rated output torque (S19/No), the motor control unit 67 sets the target torque of the front wheel driving motor 11F and the rear wheel driving motor 11R in the normal mode (step S25). The motor control unit 67 controls the driving or the regeneration of the front wheel driving motor 11F and the rear wheel driving motor 11R on the basis of the set target torque (step S26).

Meanwhile, in a case with the determination as to the presence of a motor having the estimated driving torque equal to or larger than the rated output torque (S19/Yes), the output limiting unit 65 limits the output of the motor expected to produce the output equal to or larger than the rated output torque (step S21). In one example, in a case where the estimated driving torque of the rear wheel driving motor 11R is predicted to become equal to or larger than the rated output torque, the output limiting unit 65 sets the upper limit of the output torque of the rear wheel driving motor 11R until the arrival at the uphill road, to the rated output torque or smaller. For example, the output limiting unit 65 lowers the output torque of the rear wheel driving motor 11R by making the ratio of the torque to be distributed to the rear wheel driving motor 11R smaller than the setting of the normal mode. Alternatively, the output limiting unit 65 may set the rated output torque of the rear wheel driving motor 11R as the upper limit of the target torque. Thus, the driving torque and the regenerative torque of the rear wheel driving motor 11R are set to keep from exceeding the rated output torque until the arrival at the uphill road.

Moreover, in limiting the driving torque and the regenerative torque of the rear wheel driving motor 11R to the rated output or smaller, the output limiting unit 65 may set the upper limit values of the driving torque and the regenerative torque in accordance with the gradient of the uphill road. In other words, as the estimated driving torque during the travel of the vehicle 1 along the uphill road becomes larger, the upper limit value of the output of the rear wheel driving motor 11R until the arrival at the uphill road may be set to a smaller value. This makes it possible to enhance certainty of lowering the peak of the temperature of the rear wheel driving motor 11R during the travel along the uphill road.

Furthermore, in a case where the output of the rear wheel driving motor 11R is set to be limited when the temperature of the rear wheel driving motor 11R or the temperature of the second inverter circuit that controls the rear wheel driving motor 11R reaches a predetermined restrictive temperature, the output limiting unit 65 may limit the output of the rear wheel driving motor 11R, to keep the temperature of the rear wheel driving motor 11R or the temperature of the second inverter circuit from reaching the predetermined restrictive temperature during the travel of the vehicle 1 along the uphill road. For example, the output limiting unit 65 may predict an amount of heat generation in the rear wheel driving motor 11R or the second inverter circuit during the travel of the vehicle 1 along the uphill road, and limit the driving torque and the regenerative torque of the rear wheel driving motor 11R until the arrival at the uphill road to the rated output or smaller, to keep the temperature of the rear wheel driving motor 11R from reaching the predetermined restrictive temperature during the travel of the vehicle 1 along the uphill road.

In one example, the amount of heat generation in the rear wheel driving motor 11R during the travel of the vehicle 1 along the uphill road may be calculated on the basis of the rotational speed and the output torque of the rear wheel driving motor 11R. In one example, electric power loss occurs in the rear wheel driving motor 11R in accordance with the rotational speed and the output torque of the rear wheel driving motor 11R, and the amount of heat generation changes with the electric power loss. The relation between the rotational speed and the output torque of the rear wheel driving motor 11R, and the electric power loss or the amount of heat generation in the rear wheel driving motor 11R is held in advance as a characteristic of the rear wheel driving motor 11R. The output limiting unit 65 calculates the amount of heat generation in the rear wheel driving motor 11R on the basis of the rotational speed and the output torque of the rear wheel driving motor 11R assumed from setting of the vehicle speed during the travel of an uphill road. The output limiting unit 65 converts the calculated amount of heat generation in the rear wheel driving motor 11R into an amount of the temperature rise in the rear wheel driving motor 11R. Thus, the output limiting unit 65 limits the driving torque or the regenerative torque of the rear wheel driving motor 11R until the arrival at the uphill road, to keep the temperature of the rear wheel driving motor 11R equal to or lower than a temperature obtained by subtracting the amount of the temperature rise from the restrictive temperature at the time of the arrival of the vehicle 1 at the uphill road.

Similarly, the amount of heat generation in the second inverter circuit during the travel of the vehicle 1 along an uphill road may be calculated on the basis of the rotational speed and the output torque of the rear wheel driving motor 11R. In one example, electric power loss occurs in the second inverter circuit in accordance with the rotational speed and the output torque of the rear wheel driving motor 11R, and the amount of heat generation changes with the electric power loss. The relation between the rotational speed and the output torque of the rear wheel driving motor 11R, and the electric power loss or the amount of heat generation in the second inverter circuit is held in advance as a characteristic of the second inverter circuit. The output limiting unit 65 calculates the amount of heat generation in the second inverter circuit on the basis of the rotational speed and the output torque of the rear wheel driving motor 11R assumed from the setting of the vehicle speed during the travel along an uphill road. The output limiting unit 65 converts the calculated amount of heat generation in the second inverter circuit into the amount of the temperature rise in the second inverter circuit. Thus, the output limiting unit 65 limits the driving torque or the regenerative torque of the rear wheel driving motor 11R until the arrival at the uphill road, to keep the temperature of the second inverter circuit equal to or lower than the temperature obtained by subtracting the amount of the temperature rise from the restrictive temperature at the time of the arrival of the vehicle 1 at the uphill road.

Thereafter, the motor control unit 67 sets the target torque of each of the front wheel driving motor 11F and the rear wheel driving motor 11R in the output limited mode that includes limiting the output of the rear wheel driving motor 11R having the estimated driving torque equal to or larger than the rated output torque (step S23). For example, the motor control unit 67 sets the target driving torque or the target regenerative torque of the front wheel driving motor 11F and the rear wheel driving motor 11R on the basis of a torque distribution ratio in the output limited mode that has been changed in step S21. In a case where the calculated target driving torque or the calculated target regenerative torque of the rear wheel driving motor 11R exceeds the rated output torque of the rear wheel driving motor 11R or the upper limit value set in accordance with the gradient of the uphill road, the motor control unit 67 allocates an amount of excessive torque exceeding the rated output torque or the upper limit value, to the front wheel driving motor 11F.

Alternatively, the motor control unit 67 may calculate the target driving torque or the target regenerative torque of each of the front wheel driving motor 11F and the rear wheel driving motor 11R in the normal mode as in step S25, and thereafter, correct the target driving torque or the target regenerative torque. For example, in a case where the calculated target driving torque or the calculated target regenerative torque of the rear wheel driving motor 11R exceeds the rated output torque of the rear wheel driving motor 11R, the motor control unit 67 allocates the amount of the excessive torque exceeding the rated output torque, to the front wheel driving motor 11F.

Thereafter, as with step S26, the motor control unit 67 controls the driving or the regeneration of the front wheel driving motor 11F and the rear wheel driving motor 11R on the basis of the set target driving torque or the set target regenerative torque (step S24).

Thereafter, the output increase prediction unit 63 determines whether or not the vehicle 1 has reached the uphill road (step S27). For example, the output increase prediction unit 63 may determine whether or not the vehicle 1 has reached the uphill road detected in step S15 on the basis of surrounding environment data transmitted from the surrounding environment sensor 31. Alternatively, the output increase prediction unit 63 may determine whether or not the vehicle 1 has reached the uphill road on the basis of the positional data regarding the vehicle 1 on the high-precision map data.

In a case without a determination that the vehicle 1 has reached the uphill road (S27/No), the motor control unit 67 repeats the setting of the target torque in the output limited mode (step S23) and the control of the driving or the regeneration of the front wheel driving motor 11F and the rear wheel driving motor 11R (step S24). In a case with the determination that the vehicle 1 has reached the uphill road (S27/Yes), or in the case where the control of the driving or the regeneration of the front wheel driving motor 11F and the rear wheel driving motor 11R is carried out in step S26, the processor 51 determines whether or not the driving system of the vehicle has stopped (step S29). In a case where the driving system has not stopped (S29/No), the flow returns to step S13 and the processing described above is repeated. In a case where the driving system has stopped (S29/Yes), the processor 51 ends the control processing of the front wheel driving motor 11F and the rear wheel driving motor 11R.

Figure 4:
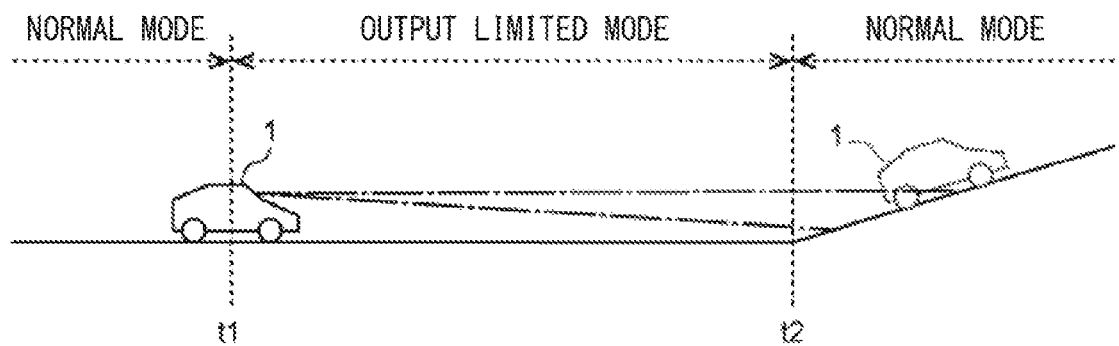
FIG. 4 is a diagram that illustrates a range of application of an output limited mode of the control apparatus for the vehicle according to the embodiment.

FIG. 4 is a diagram illustrating a range of application of the output limited mode.

Let us assume that, during the travel of the vehicle 1 along a flat road, at the time t1, the control apparatus 50 detects an uphill road ahead in the direction of travel, and determines that the estimated driving torque during the travel of the vehicle 1 along the uphill road becomes equal to or larger than the rated output torque. In this case, the mode of setting the target torque of the front wheel driving motor 11F and the rear wheel driving motor 11R is switched from the normal mode to the output limited mode. The output limited mode is continued until the time t2 when the vehicle 1 reaches the uphill road. At the time t2, the mode of setting the target torque of the front wheel driving motor 11F and the rear wheel driving motor 11R is restored to the normal mode from the output limited mode.

Thus, the output torque of the rear wheel driving motor 11R is limited to the rated output or smaller during a period from the time t1 of the detection of the uphill road to the time t2 of the arrival at the uphill road. This leads to the suppression of the temperature rise in the rear wheel driving motor 11R. Hence, it is possible to allow the vehicle 1 to enter the uphill road while providing a margin for the temperature at which the output of the rear wheel driving motor 11R is possibly lowered. After the time t2 of the arrival at the uphill road, the limitation on the output torque of the rear wheel driving motor 11R is released. Thus, the requested driving torque for the travel along the uphill road is ensured. Moreover, the travel along the uphill road is started, with the rear wheel driving motor 11R at a relatively low temperature. This makes it possible to delay the time of an arrival at a temperature at which the output of the rear wheel driving motor 11R is possibly lowered. Hence, it is possible to prevent lowered performance of the rear wheel driving motor 11R during the travel along the uphill road.

1-4. Effects

As described, the control apparatus 50 for the vehicle according to the first embodiment of the disclosure is applied to the vehicle 1 including the front wheel driving motor 11F and the rear wheel driving motor 11R. In the case with the presence of an uphill road ahead in the direction of travel of the vehicle 1, the control apparatus 50 determines whether or not the estimated driving torque of the rear wheel driving motor 11R becomes equal to or larger than the rated output torque of the rear wheel driving motor 11R during the travel along the uphill road. Moreover, in the case where the estimated driving torque of the rear wheel driving motor 11R becomes equal to or larger than the rated output torque of the rear wheel driving motor 11R during the travel along the uphill road, the control apparatus 50 limits the output torque of the rear wheel driving motor 11R to the rated output torque or smaller until the arrival of the vehicle 1 at the uphill road. Thus, the temperature rise in the rear wheel driving motor 11R until the arrival of the vehicle 1 at the uphill road is suppressed, making it possible to lower the peak of the temperature of the rear wheel driving motor 11R during the travel along the uphill road. Hence, it is possible to reduce the possibility of the lowered output of the rear wheel driving motor 11R during the travel of the vehicle 1 along the uphill road, resulting in the insufficient driving torque for the entire vehicle 1.

Moreover, the control apparatus 50 for the vehicle according to this embodiment changes the distribution ratio of the target torque to the front wheel driving motor 11F and the rear wheel driving motor 11R, and limits the output of the rear wheel driving motor 11R until the arrival of the vehicle 1 at the uphill road. This make it possible to limit the output of the rear wheel driving motor 11R by relatively simple calculation processing.

Furthermore, the control apparatus 50 for the vehicle according to this embodiment sets the upper limit value of the target torque of the rear wheel driving motor 11R until the arrival of the vehicle 1 at the uphill road on the basis of the gradient of the uphill road. This makes it possible to lower the peak of the temperature of the rear wheel driving motor 11R during the travel of the vehicle 1 along the uphill road. It is also possible to prevent the distribution ratio of the target torque to the front wheel driving motor 11F and the rear wheel driving motor 11R until the arrival of the vehicle 1 at the uphill road from being changed unnecessarily from the distribution ratio in the normal mode. This makes it possible to prevent lowered traveling performance.

In the first embodiment described above, an example of the vehicle 1 is given in which the single front wheel driving motor 11F is provided for the front wheels and the single rear wheel driving motor 11R is provided for the rear wheels. However, the vehicle 1 to which the control apparatus 50 in this embodiment is applicable is not limited to this example. The control apparatus 50 in this embodiment is also applicable to a vehicle in which a driving motor is provided for each of the left wheel and the right wheel, with respect to the front wheels, the rear wheels, or both. In a case where two driving motors are provided on the rear wheels, it is possible to produce similar effects by assuming the two driving motors to serve as the rear wheel driving motor and limiting the outputs of the two driving motors until the arrival at the uphill road. In this case, to prevent a torque difference between the left and right driving motors, the outputs of the left and right driving motors may be limited as a pair.

2. Second Embodiment

Next, description is given of a second embodiment of the disclosure.

In the second embodiment, in a case with a curve present ahead in the direction of travel of the vehicle 1, the control apparatus is configured to predict the output of the driving motor at an exit from the curve. In a case where the driving torque of the front wheel driving motor 11F or the rear wheel driving motor 11R is predicted to become equal to or larger than the rated output torque during acceleration at the exit from the curve, the control apparatus is configured to limit the regenerative torque of the driving motor on the occasion of entry into the curve to the rated output torque or smaller.

The vehicle 1 to which the control apparatus according to this embodiment is applicable has a similar configuration to the configuration of the vehicle 1 described in the first embodiment. The basic configuration of the control apparatus is similar to the configuration of the control apparatus 50 illustrated in FIG. 2. In the following, a control apparatus for a vehicle according to this embodiment is described in terms of differences from the first embodiment.

2-1. Configuration Example of Control Apparatus

In this embodiment, in a case with a curve ahead in the direction of travel of the vehicle 1, the output increase prediction unit 63 predicts the output increased state that causes the driving torque of the front wheel driving motor 11F or the rear wheel driving motor 11R to become equal to or larger than the rated output at the exit from the curve. For example, the output increase prediction unit 63 estimates the speed after deceleration when the vehicle 1 passes through the curve, on the basis of the radius of curvature of the curve. Moreover, the output increase prediction unit 63 estimates the driving torque of the front wheel driving motor 11F and the rear wheel driving motor 11R assuming that the speed is restored, at the exit from the curve, to the speed before the entry into the curve.

Presence or absence of any curves ahead in the direction of travel of the vehicle 1 may be determined by identifying the position and the direction of travel of the vehicle 1 on the high-precision map data on the basis of the positional data regarding the vehicle 1 transmitted from the GNSS sensor 35 and referring to the data regarding the radius of curvature of the road ahead in the direction of travel. Alternatively, the presence or the absence of any curves ahead in the direction of travel may be determined on the basis of the detection data transmitted from the surrounding environment sensor 31. In this case, the surrounding environment detection unit 61 also calculates the radius of curvature of the road on the basis of data regarding the detected objects of measurement. The "exit from the curve" refers to a region beyond a point of inflection where the radius of curvature of the curve becomes minimum.

In the case where the output increased state is predicted by the output increase prediction unit 63, the output limiting unit 65 provides setting to limit the regenerative torque of any of the driving motors expected to produce the driving torque equal to or larger than the rated output during the deceleration when the vehicle 1 passes through the curve, to the rated output or smaller. This makes it possible to suppress the temperature rise in the relevant driving motor until the arrival of the vehicle 1 at the exit from the curve, and to lower the peak of the temperature of the relevant driving motor during the acceleration at the exit from the curve. The method of limiting the target regenerative torque of the driving motor may be similar to the method of limiting the driving torque and the regenerative torque of the rear wheel driving motor 11R to the rated output or smaller in the first embodiment.

2-2. Processing Operation Example

Figure 5:
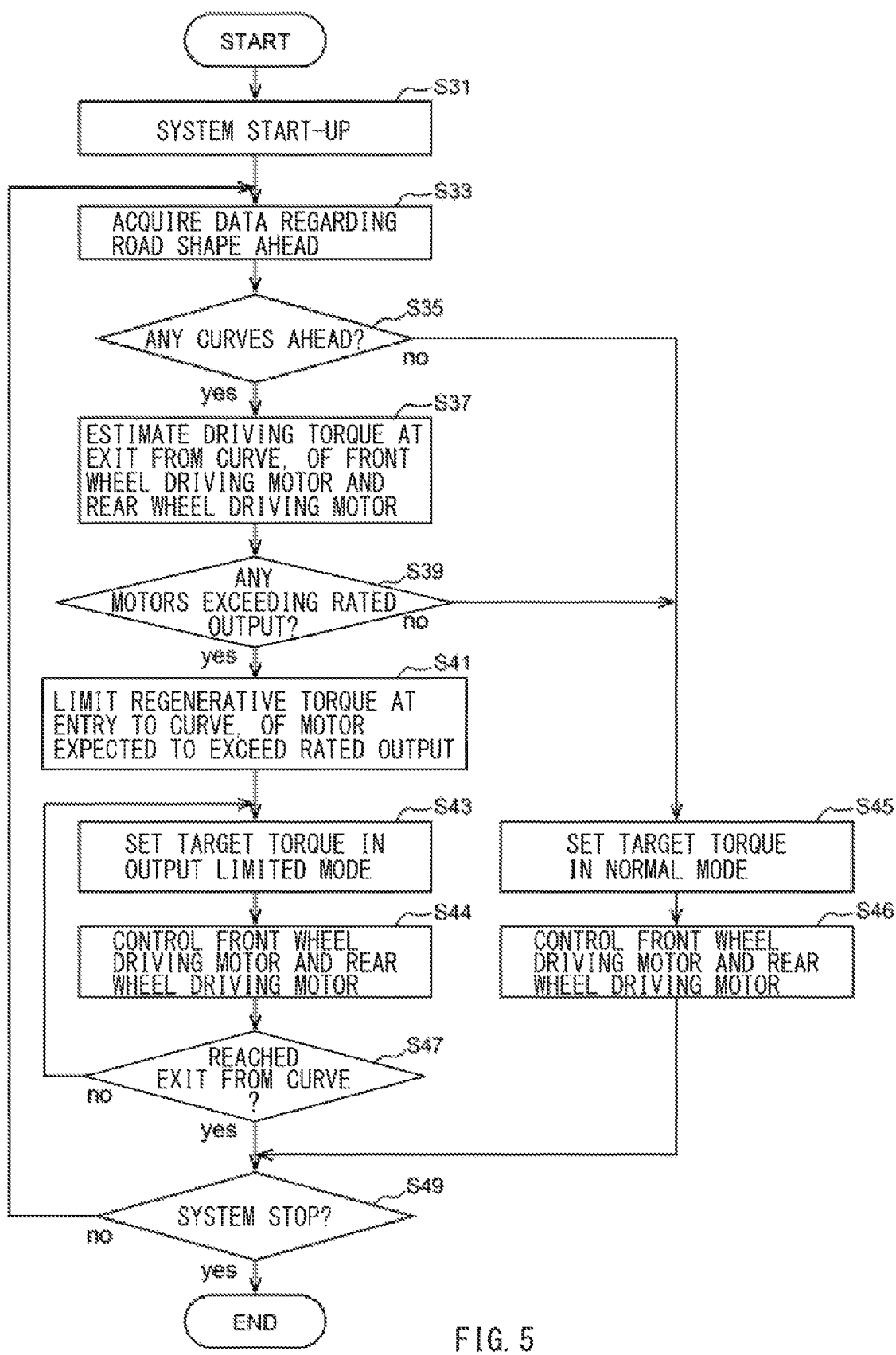
FIG. 5 is a schematic diagram that illustrates a configuration example of a vehicle to which a control apparatus for a vehicle according to one embodiment of the disclosure is applicable.

FIG. 5 is a flowchart illustrating control processing operation of the front wheel driving motor 11F and the rear wheel driving motor 11R by the control apparatus 50 for the vehicle in this embodiment. In the following description, an example is given in which a curve is present ahead in the direction of travel of the vehicle 1, and the output of the front wheel driving motor 11F or the rear wheel driving motor 11R is limited during the deceleration when the vehicle 1 passes through the curve.

First, upon the start-up of the driving system of the vehicle 1 (step S31), the surrounding environment detection unit 61 of the processor 51 acquires the road shape data ahead in the direction of travel of the vehicle 1 (step S33). In one example, the surrounding environment detection unit 61 may identify the position and the direction of travel of the vehicle 1 on the high-precision map data on the basis of the positional data regarding the vehicle 1 transmitted from the GNSS sensor 35, and acquire the road shape data ahead in the direction of travel of the vehicle 1 by referring to the high-precision map data. At this occasion, the surrounding environment detection unit 61 acquires the data regarding the radius of curvature of the road. The high-precision map data may be held in the storage 53, or alternatively, the high-precision map data may be held in an external server configured to be coupled through wireless communication.

The surrounding environment detection unit 61 may detect the objects of measurement that allow for the recognition of the road shape, e.g., lane lines, curb stones, guardrails of the road ahead, on the basis of the detection data transmitted from the forward view capturing cameras 31LF and 31RF, and the LiDAR 31S. In this case, the surrounding environment detection unit 61 also calculates the radius of curvature of the road on the basis of the data regarding the detected objects of measurement.

Thereafter, the output increase prediction unit 63 determines the presence or the absence of any curves ahead in the direction of travel of the vehicle 1 (step S35). In one example, the output increase prediction unit 63 determines whether or not a curve having a predetermined radius of curvature or smaller continues for a predetermined distance or more, on the basis of the road shape data acquired in step S33. The predetermined radius of curvature is set to determine a degree of deceleration when passing through the curve. The predetermined radius of curvature may be set to any value within a range of, for example, 5 m to 30 m both inclusive. The predetermined distance may be set in accordance with magnitude of the radius of curvature. The larger the radius of curvature, the predetermined distance is set to a longer distance.

In a case without a determination as to the presence of any curves ahead (S35/No), the motor control unit 67 does not limit the outputs of the front wheel driving motor 11F and the rear wheel driving motor 11R, but sets their target torque in the normal mode (step S45). Thereafter, the motor control unit 67 controls the driving or the regeneration of the front wheel driving motor 11F and the rear wheel driving motor 11R on the basis of the set target driving torque or the set target regenerative torque (step S46). Steps S45 and S46 are carried out in accordance with steps S25 and S26 described in the first embodiment.

In a case with the determination as to the presence of a curve ahead (S35/Yes), the output increase prediction unit 63 estimates the driving torque of the front wheel driving motor 11F and the rear wheel driving motor 11R at the exit from the curve (step S37). For example, the output increase prediction unit 63 predicts the brake operation and the accelerator operation by the driver on the basis of the current vehicle speed of the vehicle 1 detected by the vehicle state sensor 33, and the radius of curvature and the distance of the curve, and estimates the driving torque for the vehicle 1 during the acceleration at the exit from the curve. Moreover, the output increase prediction unit 63 calculates driving torque obtained by distributing the driving torque estimated for the vehicle 1 to the front wheel driving motor 11F and the rear wheel driving motor 11R in accordance with the setting of the normal mode (hereinafter, also referred to as "estimated driving torque").

Thereafter, the output increase prediction unit 63 determines the presence or the absence of any motors having the estimated driving torque equal to or larger than the rated output torque (step S39). The rated output torque of the front wheel driving motor 11F and the rear wheel driving motor 11R is grasped from the data regarding the specifications and held in the storage 53 in advance. The output increase prediction unit 63 compares the estimated driving torque of each of the front wheel driving motor 11F and the rear wheel driving motor 11R with the rated output torque, and determines whether or not the estimated driving torque of one or both of the front wheel driving motor 11F and the rear wheel driving motor 11R is equal to or larger than the rated output torque. The output increase prediction unit 63 may determine whether or not the estimated driving torque is equal to or larger than the rated output torque, solely for the driving motor having the estimated driving torque equal to or larger than the rated output torque, on the basis of the distribution ratio of the driving torque in the normal mode.

In a case without a determination as to the presence of any motors having the estimated driving torque equal to or larger than the rated output torque (S39/No), the motor control unit 67 sets the target torque of the front wheel driving motor 11F and the rear wheel driving motor 11R in the normal mode (step S45). Moreover, the motor control unit 67 controls the driving or the regeneration of the front wheel driving motor 11F and the rear wheel driving motor 11R on the basis of the set target torque (step S46).

In a case with the determination as to the presence of a motor having the estimated driving torque equal to or larger than the rated output torque (S39/Yes), the output limiting unit 65 limits the output of the motor having the estimated driving torque equal to or larger than the rated output torque (step S41). For example, in a case where the estimated driving torque of the rear wheel driving motor 11R is predicted to become equal to or larger than the rated output torque, the output limiting unit 65 sets the upper limit of the regenerative torque of the rear wheel driving motor 11R when passing through the curve, to the rated output torque or smaller. In one example, the output limiting unit 65 lowers the regenerative torque of the rear wheel driving motor 11R by making the ratio of the regenerative torque to be distributed to the rear wheel driving motor 11R smaller than the setting of the normal mode. Alternatively, the output limiting unit 65 may set the rated output torque of the rear wheel driving motor 11R as the upper limit of the regenerative torque. Thus, the regenerative torque of the rear wheel driving motor 11R is set to keep from exceeding the rated output torque until the arrival of the vehicle 1 at the exit from the curve.

In a case where the output of the rear wheel driving motor 11R is set to be limited when the temperature of the rear wheel driving motor 11R or the temperature of the second inverter circuit that controls the rear wheel driving motor 11R reaches the predetermined restrictive temperature, the output limiting unit 65 may limit the regenerative torque of the rear wheel driving motor 11R to keep the temperature of the rear wheel driving motor 11R or the temperature of the second inverter circuit from reaching the predetermined restrictive temperature during the acceleration of the vehicle 1 at the exit from the curve. For example, the output limiting unit 65 may predict the amount of heat generation in the rear wheel driving motor 11R or the second inverter circuit during the acceleration of the vehicle 1 at the exit from the curve, and limit the regenerative torque of the rear wheel driving motor 11R until the arrival at the exit from the curve, to the rated output or smaller, to keep the temperature of the rear wheel driving motor 11R or the second inverter circuit from reaching the predetermined limitation temperature during the acceleration of the vehicle 1 at the exit from the curve. Detailed processing may be carried out in accordance with the contents of the processing described in the first embodiment.

Thereafter, the motor control unit 67 sets the target torque of each driving motor in the output limited mode that includes limiting the output of the driving motor having the estimated driving torque equal to or larger than the rated output torque (step S43). For example, the motor control unit 67 sets the target driving torque or the target regenerative torque of the front wheel driving motor 11F and the rear wheel driving motor 11R on the basis of the torque distribution ratio in the output limited mode that has been changed in step S41. Thus, in the case where the calculated target regenerative torque of the front wheel driving motor 11F or the rear wheel driving motor 11R exceeds the rated output torque, the motor control unit 67 allocates the amount of the excessive torque exceeding the rated output torque, to the other driving motor. Alternatively, the motor control unit 67 may allocate the amount of the excessive torque to the target braking torque of a hydraulic braking system.

Alternatively, the motor control unit 67 may calculate the target driving torque or the target regenerative torque of each of the front wheel driving motor 11F and the rear wheel driving motor 11R in the normal mode as with step S45, and thereafter, correct the target regenerative torque. For example, in a case where the calculated target regenerative torque of the front wheel driving motor 11F or the rear wheel driving motor 11R exceeds the rated output torque, the motor control unit 67 allocates the amount of the excessive torque exceeding the rated output torque, to the other driving motor.

Thereafter, as with step S46, the motor control unit 67 controls the driving or the regeneration of the front wheel driving motor 11F and the rear wheel driving motor 11R on the basis of the set target driving torque or the set target regenerative torque (step S44).

Thereafter, the output increase prediction unit 63 determines whether or not the vehicle 1 has reached the exit from the curve (step S27). For example, the output increase prediction unit 63 may determine whether or not the vehicle 1 has reached the exit from the curve detected in step S35 on the basis of the surrounding environment data transmitted from the surrounding environment sensor 31. Alternatively, the output increase prediction unit 63 may determine whether or not the vehicle 1 has reached the exit from the curve on the basis of the positional data regarding the vehicle 1 on the high-precision map data.

In a case without a determination that the vehicle 1 has reached the exit from the curve (S47/No), the motor control unit 67 repeats the setting of the target torque in the output limited mode (step S43) and the control of the driving or the regeneration of the front wheel driving motor 11F and the rear wheel driving motor 11R (step S44). In a case with the determination that the vehicle 1 has reached the exit from the curve (S47/Yes), or in a case where the control of the driving or the regeneration of the front wheel driving motor 11F and the rear wheel driving motor 11R is carried out in step S46, the processor 51 determines whether or not the driving system of the vehicle has stopped (step S49). In a case where the driving system has not stopped (S49/No), the flow returns to step S33 and the processing described above is repeated. In a case where the driving system has stopped (S49/Yes), the processor 51 ends the control processing of the front wheel driving motor 11F and the rear wheel driving motor 11R.

Figure 6:
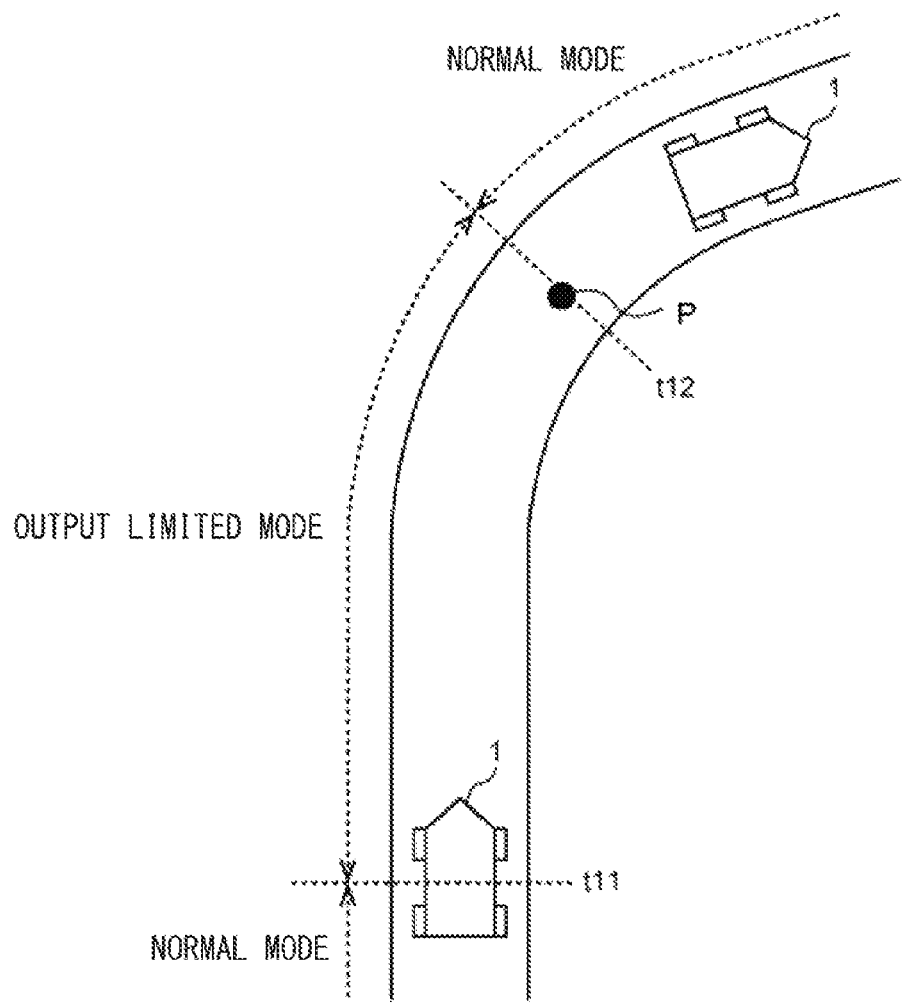
FIG. 6 is a diagram that illustrates a range of application of an output limited mode of the control apparatus for the vehicle according to the embodiment.

FIG. 6 is a diagram illustrating a range of application of the output limited mode.

Let us assume that, while the vehicle 1 is traveling along a straight road, at the time t11, the control apparatus 50 detects a curve ahead in the direction of travel, and determines that the estimated driving torque of the rear wheel driving motor 11R when the vehicle 1 accelerates at the exit from the curve becomes equal to or larger than the rated output torque. In this case, the mode of setting the target torque of the front wheel driving motor 11F and the rear wheel driving motor 11R is switched from the normal mode to the output limited mode. The output limited mode is continued until the time t12 of the arrival of the vehicle 1 at a point of inflection P of the curve. At the time t12, the mode of setting the target torque of the front wheel driving motor 11F and the rear wheel driving motor 11R is restored to the normal mode from the output limited mode.

Thus, during a period from the time t11 of the detection of the curve to the time t12 of the arrival at the point of inflection P of the curve, the regenerative torque of the rear wheel driving motor 11R is limited to the rated output or smaller. This allows for the suppression of the temperature rise in the rear wheel driving motor 11R. Hence, it is possible to accelerate the vehicle 1 at the exit from the curve while maintaining the margin for the temperature at which the output of the rear wheel driving motor 11R is possibly lowered. After the time t12 of the arrival at the point of inflection P of the curve, the acceleration of the vehicle 1 is started, with the rear wheel driving motor 11R at a relatively low temperature. Hence, it is possible to delay the time of the arrival at the temperature at which the output of the rear wheel driving motor 11R is possibly lowered, making it possible to prevent the lowered performance of the rear wheel driving motor 11R during the acceleration at the exit from the curve.

2-3. Effects

As described, the control apparatus 50 for the vehicle in the second embodiment of the disclosure is applied to the vehicle 1 including the front wheel driving motor 11F and the rear wheel driving motor 11R. In the case with a curve present ahead in the direction of travel of the vehicle 1, the control apparatus 50 determines whether or not the estimated driving torque of the front wheel driving motor 11F or the rear wheel driving motor 11R becomes equal to or larger than the rated output torque during the acceleration at the exit from the curve. Moreover, in the case where the estimated driving torque of the front wheel driving motor 11F or the rear wheel driving motor 11R becomes equal to or larger than the rated output torque during the acceleration at the exit from the curve, the control apparatus 50 limits the output torque of the relevant driving motor to the rated output torque or smaller until the arrival of the vehicle 1 at the exit from the curve. This makes it possible to suppress the temperature rise in the rear wheel driving motor 11R until the arrival of the vehicle 1 at the exit from the curve, making it possible to lower the peak of the temperature of the relevant driving motor during the acceleration at the exit from the curve. Hence, it is possible to prevent the possibility of the lowered output of the relevant driving motor during the acceleration of the vehicle 1 at the exit from the curve, causing a delay in the acceleration.

In the second embodiment described above, an example of the vehicle 1 is given in which the single front wheel driving motor 11F is provided for the front wheels and the single rear wheel driving motor 11R is provided for the rear wheels. However, the vehicle 1 to which the control apparatus 50 in this embodiment is applicable is not limited to this example. The control apparatus 50 in this embodiment is also applicable to a vehicle in which a driving motor is provided for each of the left wheel and the right wheel, with respect to the front wheels, the rear wheels, or both. In this case, to prevent the torque difference between the left and right driving motors, the outputs of the left and right driving motors may be limited as a pair.

3. Third Embodiment

Description is given next of a third embodiment of the disclosure.

In the third embodiment, the control apparatus is applied to a vehicle including two driving motors coupled to the left and right wheels, with respect to the front wheels, the rear wheels, or both, and configured to carry out a torque vectoring control. The torque vectoring control includes assisting in cornering by generating a torque difference between the left and right wheels on the occasion of cornering of the vehicle. The control apparatus in this embodiment is configured to predict the outputs of the driving motors in carrying out the torque vectoring control, with a curve present ahead in the direction of travel of the vehicle. In a case where the driving torque of any of the driving motors is predicted to become equal to or larger than the rated output torque, the control apparatus is configured to limit the driving torque and the regenerative torque of the driving motor until the entry into the curve, to the rated output or smaller.

3-1. Configuration Example of Vehicle

Figure 7:
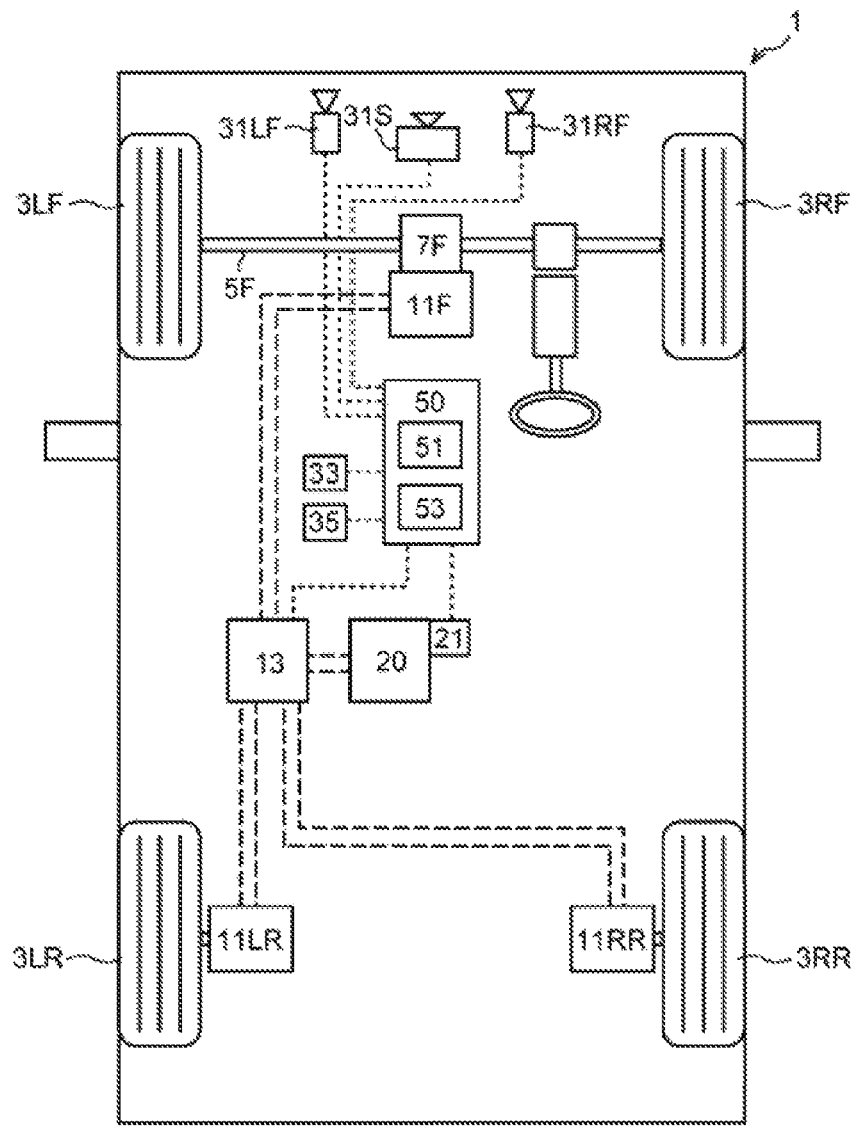
FIG. 7 is a schematic diagram that illustrates a configuration example of a vehicle to which a control apparatus for a vehicle according to one embodiment of the disclosure is applicable.

FIG. 7 is a schematic diagram illustrating a configuration example of a vehicle 1A on which the control apparatus 50 for the vehicle according to this embodiment is mounted. In the vehicle 1A illustrated in FIG. 7, in place of the rear wheel driving motor 11R of the vehicle 1 illustrated in FIG. 1, a left rear wheel driving motor 11LR and a right rear wheel driving motor 11RR are provided. The left rear wheel driving motor 11LR is coupled to the left rear wheel 3LR. The right rear wheel driving motor 11RR is coupled to the right rear wheel 3RR. The left rear wheel driving motor 11LR and the right rear wheel driving motor 11RR are provided independently to keep the driving torque and the regenerative torque generated by one of them from being transmitted to the other.

The inverter unit 13 includes a first inverter circuit, a second inverter circuit, and a third inverter circuit. The first inverter circuit controls the driving of the front wheel driving motor 11F. The second inverter circuit controls driving of the left rear wheel driving motor 11LR. The third inverter circuit controls driving of the right rear wheel driving motor 11RR. Otherwise. the configuration of the vehicle 1A may be similar to the configuration of the vehicle 1 illustrated in FIG. 1, and description thereof is omitted.

3-2. Configuration Example of Control Apparatus

The basic configuration of the control apparatus 50 is similar to the configuration of the control apparatus 50 illustrated in FIG. 2. In the following, the control apparatus 50 for the vehicle in this embodiment is described in terms of differences from the first embodiment.

In this embodiment, in a case where the vehicle 1A travels along a right curve, the motor control unit 67 assists in rightward cornering of the vehicle 1A by making driving torque of the left rear wheel driving motor 11LR larger than driving torque of the right rear wheel driving motor 11RR. Moreover, in a case where the vehicle 1A travels along a left curve, the motor control unit 67 assists in leftward cornering of the vehicle 1A by making the driving torque of the right rear wheel driving motor 11RR larger than the driving torque of the left rear wheel driving motor 11LR.

In one example, the motor control unit 67 distributes the target driving torque for the entire vehicle 1A to the front wheel driving motor 11F for the front wheels, the right rear wheel driving motor 11RR and the left rear wheel driving motor 11LR for the rear wheels, in accordance with a preset basic ratio. On straight travel, the motor control unit 67 distributes the driving torque distributed to the rear wheels, to the right rear wheel driving motor 11RR and the left rear wheel driving motor 11LR, evenly at a ratio of 5:5. When cornering, the motor control unit 67 distributes the driving torque distributed to the rear wheels, to the right rear wheel driving motor 11RR and the left rear wheel driving motor 11LR, to allow a ratio of the driving torque of the driving motor provided on the opposite side to a direction of cornering to be larger. The larger the curvature of the curve is, the larger the ratio of the driving torque to be distributed may be.

In the case with a curve ahead in the direction of travel of the vehicle 1A, the output increase prediction unit 63 predicts the output increased state that causes the driving torque of the left rear wheel driving motor 11LR or the right rear wheel driving motor 11RR to become equal to or larger than the rated output because of the torque vectoring control to be carried out when passing through the curve. For example, the output increase prediction unit 63 estimates the driving torque of each of the left rear wheel driving motor 11LR and the right rear wheel driving motor 11RR calculated by the motor control unit 67 by the method of calculating the driving torque as described above, on the basis of the radius of curvature and a length, i.e., a distance of continuation, of the curve.

The presence or the absence of any curves ahead in the direction of travel of the vehicle 1A may be determined by identifying the position and the direction of travel of the vehicle 1A on the high-precision map data on the basis of the positional data regarding the vehicle 1A transmitted from the GNSS sensor 35, and referring to the data regarding the radius of curvature of the road ahead in the direction of travel. Alternatively, the presence or the absence of any curves ahead in the direction of travel may be determined on the basis of the detection data transmitted from the surrounding environment sensor 31. In this case, the surrounding environment detection unit 61 also calculates the radius of curvature of the road on the basis of the data regarding the detected objects of measurement.

Moreover, in a case where the output increase prediction unit 63 predicts that the driving torque of the left rear wheel driving motor 11LR or the right rear wheel driving motor 11RR becomes equal to or larger than the rated output torque because of the torque vectoring control to be carried out when the vehicle 1A passes through the curve, the output limiting unit 65 provides setting to limit the driving torque and the regenerative torque of the left rear wheel driving motor 11LR and the right rear wheel driving motor 11RR to the rated output or smaller. This makes it possible to suppress the temperature rise in the left rear wheel driving motor 11LR and the right rear wheel driving motor 11RR until the start of the torque vectoring control. Hence, it is possible to lower the peak of the temperature of the left rear wheel driving motor 11LR and the right rear wheel driving motor 11RR when passing through the curve.

One reason for limiting not the output of the driving motor having the driving torque equal to or larger than the rated output torque, but the outputs of both the left rear wheel driving motor 11LR and the right rear wheel driving motor 11RR is to prevent a difference in the driving torque between the left and right driving motors on the straight travel before the vehicle 1A enters the curve. The method of limiting the target regenerative torque of the driving motors may be similar to the method of limiting the driving torque and the regenerative torque of the rear wheel driving motor 11R to the rated output or smaller in the first embodiment.

3-3. Processing Operation Example

Figure 8:
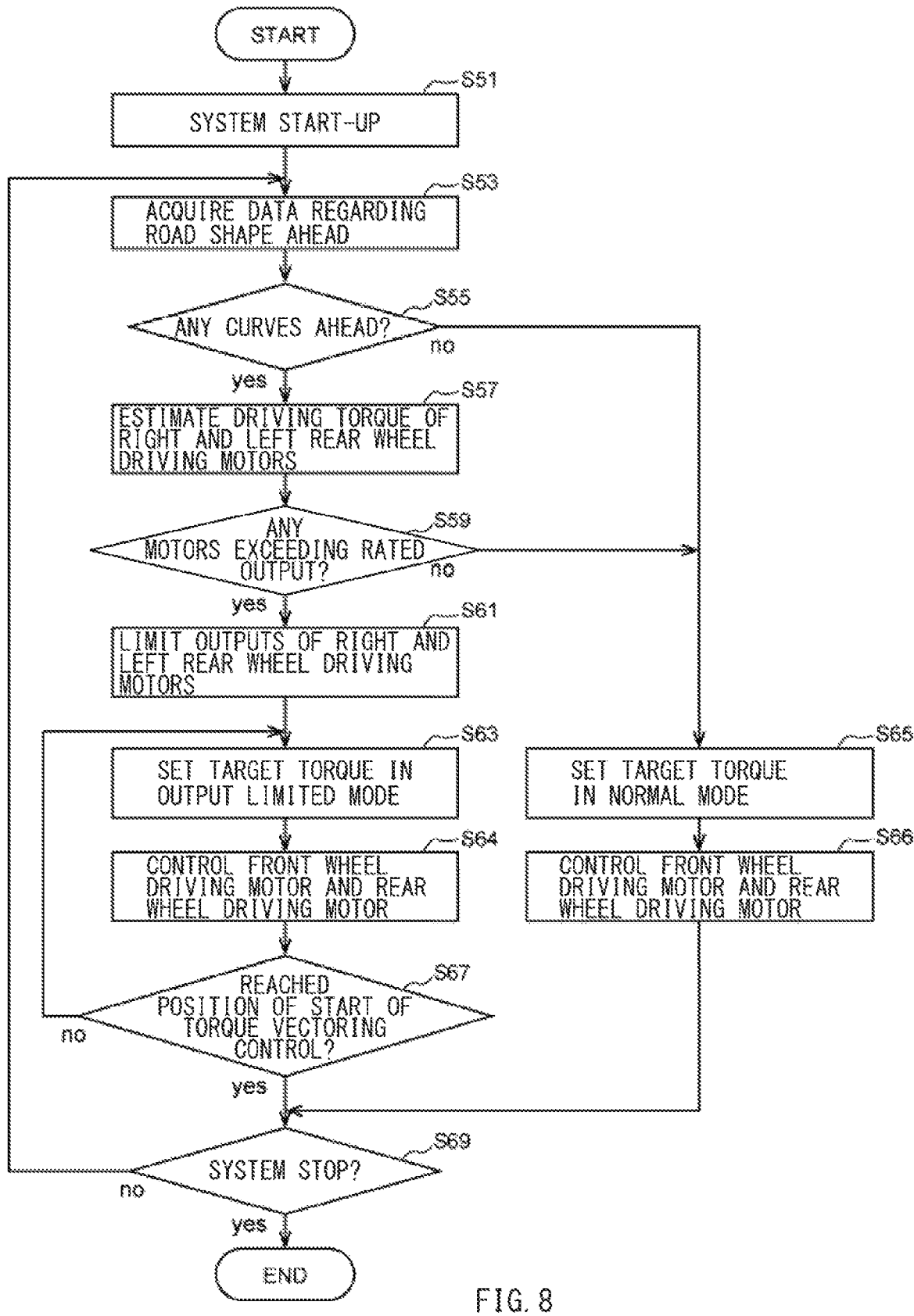
FIG. 8 is a flowchart of an operation example of the control apparatus for the vehicle according to the embodiment.

FIG. 8 is a flowchart illustrating control processing operation of the front wheel driving motor 11F, the left rear wheel driving motor 11LR, and the right rear wheel driving motor 11RR by the control apparatus 50 for the vehicle in this embodiment. In the following description, an example is given in which a curve is present ahead in the direction of travel of the vehicle 1A, and the output of the left rear wheel driving motor 11LR or the right rear wheel driving motor 11RR is limited before the torque vectoring control is carried out when the vehicle 1A passes through the curve.

First, upon a start-up of a driving system of the vehicle 1A (step S51), the surrounding environment detection unit 61 of the processor 51 acquires the road shape data ahead in the direction of travel of the vehicle 1A (step S53). In this embodiment, as with step S33 in the processing operation example described in the second embodiment, the surrounding environment detection unit 61 acquires the data regarding the radius of curvature of the road ahead in the direction of travel.

Thereafter, the output increase prediction unit 63 determines the presence or the absence of any curves ahead in the direction of travel of the vehicle 1A (step S55). In one example, the output increase prediction unit 63 determines whether or not a curve having a predetermined radius of curvature or smaller continues for a predetermined distance or more, on the basis of the road shape data acquired in step S53. The predetermined radius of curvature is set to determine whether the distribution ratio of the driving torque to the left rear wheel driving motor 11LR or the right rear wheel driving motor 11RR in the torque vectoring control to be carried out when passing through the curve is equal to or larger than a predetermined value. The predetermined radius of curvature may be set to any value within a range of, for example, 5 m to 30 m both inclusive. The predetermined distance may be set in accordance with magnitude of the radius of curvature. As the radius of curvature is larger, the predetermined distance may be set to a longer distance.

In a case without a determination as to the presence of any curves ahead (S55/No), the motor control unit 67 does not limit the outputs of the left rear wheel driving motor 11LR and the right rear wheel driving motor 11RR, but sets the target torque of the front wheel driving motor 11F, the left rear wheel driving motor 11LR, and the right rear wheel driving motor 11RR in the normal mode (step S65). Thereafter, the motor control unit 67 controls the driving or the regeneration of the front wheel driving motor 11F, the left rear wheel driving motor 11LR, and the right rear wheel driving motor 11RR on the basis of the set target driving torque or the set target regenerative torque (step S66). Steps S65 and S66 are carried out in accordance with steps S25 and S26 described in the first embodiment.

In a case with the determination as to the presence of a curve ahead (S55/Yes), the output increase prediction unit 63 estimates the driving torque of the left rear wheel driving motor 11LR and the right rear wheel driving motor 11RR when the torque vectoring control is carried out while passing through the curve (step S57). For example, the output increase prediction unit 63 predicts the brake operation and the accelerator operation by the driver on the basis of the current vehicle speed of the vehicle 1A detected by the vehicle state sensor 33 and the radius of curvature and the distance of the curve, and estimates the driving torque for the vehicle 1A when passing through the curve. Moreover, the output increase prediction unit 63 calculates the driving torque in the case where the estimated driving torque is distributed to the front wheels and the rear wheels in accordance with the setting of the normal mode. Furthermore, the output increase prediction unit 63 calculates driving torque obtained by distributing the driving torque distributed to the rear wheels to the left rear wheel driving motor 11LR and the right rear wheel driving motor 11RR in accordance with a distribution ratio of the torque vectoring (hereinafter, also referred to as "estimated driving torque").

Thereafter, the output increase prediction unit 63 determines the presence or the absence of any motors having the estimated driving torque equal to or larger than the rated output torque (step S59). The rated output torque of the left rear wheel driving motor 11LR and the right rear wheel driving motor 11RR is grasped from the data regarding the specifications, and held in the storage 53 in advance. The output increase prediction unit 63 compares the estimated driving torque of each of the left rear wheel driving motor 11LR and the right rear wheel driving motor 11RR with the rated output torque, and determines whether or not the estimated driving torque of one or both of the left rear wheel driving motor 11LR and the right rear wheel driving motor 11RR is equal to or larger than the rated output torque. Alternatively, the output increase prediction unit 63 may determine whether or not the estimated driving torque is equal to or larger than the rated output torque, solely for the driving motor having the larger distribution ratio, out of the left rear wheel driving motor 11LR and the right rear wheel driving motor 11RR.

In a case without a determination as to the presence of any motors having the estimated driving torque equal to or larger than the rated output torque (S59/No), the motor control unit 67 sets the target torque of the front wheel driving motor 11F, the left rear wheel driving motor 11LR, and the right rear wheel driving motor 11RR in the normal mode (step S65). Moreover, the motor control unit 67 controls the driving or the regeneration of the front wheel driving motor 11F, the left rear wheel driving motor 11LR, and the right rear wheel driving motor 11RR on the basis of the set target torque (step S66).

In a case with the determination as to the presence of a motor having the estimated driving torque equal to or larger than the rated output torque (S59/Yes), the output limiting unit 65 limits the output of the motor having the estimated driving torque equal to or larger than the rated output torque (step S61). For example, in a case where the estimated driving torque of the left rear wheel driving motor 11LR or the right rear wheel driving motor 11RR is predicted to become equal to or larger than the rated output torque, the output limiting unit 65 sets the upper limit of the regenerative torque of the left rear wheel driving motor 11LR and the right rear wheel driving motor 11RR, to the rated output torque or smaller. In one example, the output limiting unit 65 reduces the regenerative torque of the left rear wheel driving motor 11LR or the right rear wheel driving motor 11RR by making the ratio of the driving torque or the regenerative torque to be distributed to the rear wheels smaller than the setting of the normal mode. Alternatively, the output limiting unit 65 may set the rated output torque of the left rear wheel driving motor 11LR or the right rear wheel driving motor 11RR as the upper limit of the regenerative torque.

One reason for limiting not the output of the driving motor having the driving torque equal to or larger than the rated output torque, but the outputs of both the left rear wheel driving motor 11LR and the right rear wheel driving motor 11RR is to prevent a difference in the driving torque between the left and right driving motors on the straight travel before the vehicle 1A enters the curve. Thus, the driving torque and the regenerative torque of the left rear wheel driving motor 11LR or the right rear wheel driving motor 11RR are set to keep from exceeding the rated output torque until the start of the torque vectoring control.

In a case with setting in which the output of the left rear wheel driving motor 11LR or the right rear wheel driving motor 11RR is limited when the temperatures of the left rear wheel driving motor 11LR and the right rear wheel driving motor 11RR, or the temperatures of the second inverter circuit that controls the left rear wheel driving motor 11LR and the third inverter circuit that controls the right rear wheel driving motor 11RR reach the predetermined restrictive temperature, the output limiting unit 65 may limit the driving torque and the regenerative torque of the left rear wheel driving motor 11LR and the right rear wheel driving motor 11RR, to keep the temperature of the left rear wheel driving motor 11LR or the right rear wheel driving motor 11RR, or the temperature of the second inverter circuit or the third inverter circuit from reaching the predetermined restrictive temperature while the torque vectoring control is being carried out. For example, the output limiting unit 65 may predict an amount of heat generation in the left rear wheel driving motor 11LR or the second inverter circuit while the torque vectoring control is carried out when the vehicle 1A passes through the right curve, and limit the regenerative torque of the left rear wheel driving motor 11LR until the start of the torque vectoring control, to the rated output or smaller, to keep the temperature of the left rear wheel driving motor 11LR or the second inverter circuit from reaching the predetermined restrictive temperature while the torque vectoring control is carried out. Detailed processing may be carried out in accordance with the contents of the processing described in the first embodiment.

Thereafter, the motor control unit 67 sets the target torque of the front wheel driving motor 11F, the left rear wheel driving motor 11LR, and the right rear wheel driving motor 11RR in the output limited mode that includes limiting the outputs of the left rear wheel driving motor 11LR and the right rear wheel driving motor 11RR (step S63). For example, the motor control unit 67 sets the target driving torque or the target regenerative torque of the front wheel driving motor 11F, the left rear wheel driving motor 11LR, and the right rear wheel driving motor 11RR on the basis of the torque distribution ratio to the front wheels and the rear wheels in the output limited mode that has been changed in step S61. In a case where the calculated target driving torque or the calculated target regenerative torque of the left rear wheel driving motor 11LR and the right rear wheel driving motor 11RR exceeds the rated output torque, the motor control unit 67 subtracts the amount of the excessive torque exceeding the rated output torque from the torque of the left rear wheel driving motor 11LR and the right rear wheel driving motor 11RR, and allocates the amount of the excessive torque to the front wheel driving motor 11F. Alternatively, the motor control unit 67 may allocate the amount of the excessive torque to the target braking torque of the hydraulic braking system.

In another alternative, the motor control unit 67 may calculate the target driving torque or the target regenerative torque of each of the front wheel driving motor 11F, the left rear wheel driving motor 11LR, and the right rear wheel driving motor 11RR in the normal mode as in step S65, and thereafter, correct the target driving torque or the target regenerative torque. For example, in the case where the calculated target driving torque or the calculated target regenerative torque of the left rear wheel driving motor 11LR or the right rear wheel driving motor 11RR exceeds the rated output torque, the motor control unit 67 subtracts the amount of the excessive torque exceeding the rated output torque from the torque of the left rear wheel driving motor 11LR and the right rear wheel driving motor 11RR, and allocates the amount of the excessive torque to the front wheel driving motor 11F.

Thereafter, as with step S66, the motor control unit 67 controls the driving or the regeneration of the front wheel driving motor 11F, the left rear wheel driving motor 11LR, and the right rear wheel driving motor 11RR on the basis of the set target driving torque or the set target regenerative torque (step S64).

Thereafter, the output increase prediction unit 63 determines whether or not the vehicle 1A has reached a position of a start of execution of the torque vectoring control (step S67). The position of the start of the execution of the torque vectoring control may be determined as a position at which the radius of curvature of the road becomes equal to or smaller than a predetermined threshold value. For example, the output increase prediction unit 63 may determine whether or not the vehicle 1A has reached the position of the start of the execution of the torque vectoring control, on the basis of the surrounding environment data transmitted from the surrounding environment sensor 31. Alternatively, the output increase prediction unit 63 may determine whether or not the vehicle 1A has reached the position of the start of the execution of the torque vectoring control, on the basis of the positional data regarding the vehicle 1A on the high-precision map data.

In a case without a determination that the vehicle 1A has reached the position of the start of the execution of the torque vectoring control (S67/No), the motor control unit 67 repeats the setting of the target torque in the output limited mode (step S63), and the control of the driving or the regeneration of the front wheel driving motor 11F, the left rear wheel driving motor 11LR, and the right rear wheel driving motor 11RR (step S64). In a case with the determination that the vehicle 1A has reached the position of the start of the execution of the torque vectoring control (S67/Yes), or in a case where the control of the driving or the regeneration of the front wheel driving motor 11F, the left rear wheel driving motor 11LR, and the right rear wheel driving motor 11RR is carried out in step S66, the processor 51 determines whether or not the driving system of the vehicle has stopped (step S69). In a case where the driving system has not stopped (S69/No), the flow returns to step S63, and the processing described above is repeated. In a case where the driving system has stopped (S69/Yes), the processor 51 ends the control processing of the front wheel driving motor 11F, the left rear wheel driving motor 11LR, and the right rear wheel driving motor 11RR.

Figure 9:
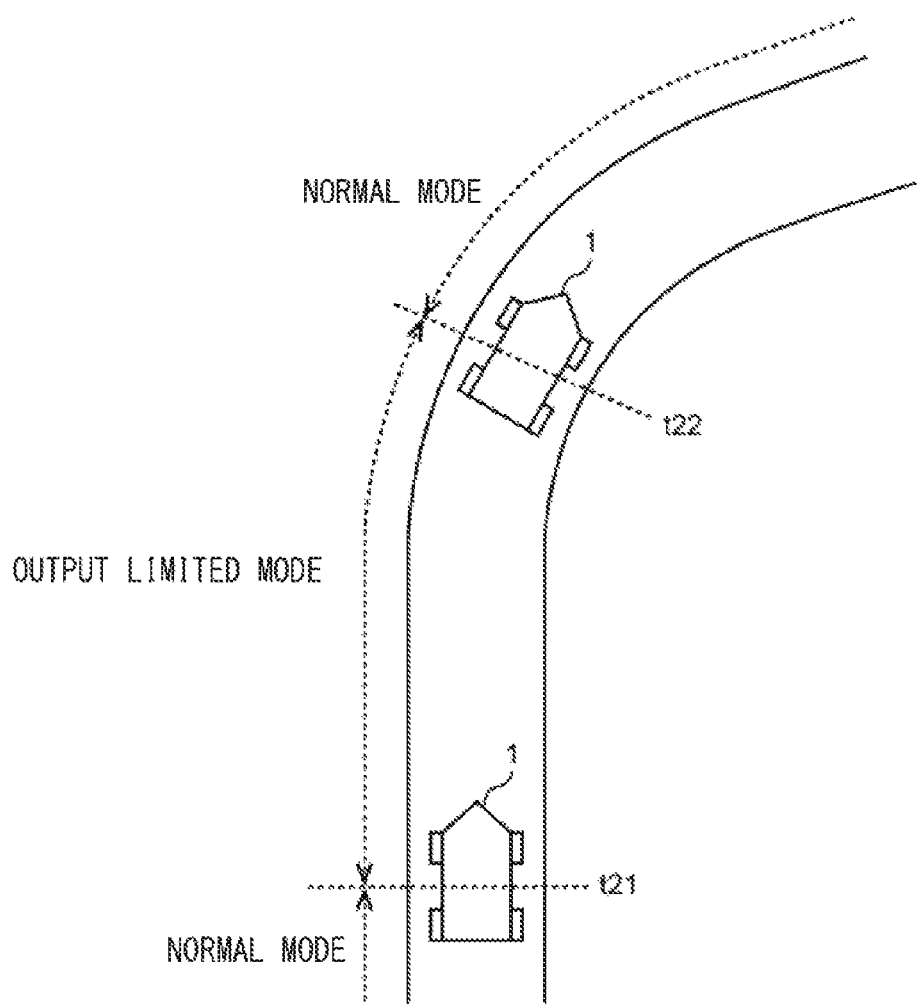
FIG. 9 is a diagram that illustrates a range of application of an output limited mode of the control apparatus for the vehicle according to the embodiment.

FIG. 9 is a diagram illustrating a range of application of the output limited mode.

Let us assume that, while the vehicle 1A is traveling along a straight road, at the time t21, the control apparatus 50 detects a curve ahead in the direction of travel, and determines that the estimated driving torque of the left rear wheel driving motor 11LR during the execution of the torque vectoring control when the vehicle 1A passes through the curve becomes equal to or larger than the rated output torque. In this case, the mode of setting the target torque of the front wheel driving motor 11F, the left rear wheel driving motor 11LR, and the right rear wheel driving motor 11RR is switched from the normal mode to the output limited mode. The output limited mode is continued until the time t22 of an arrival at the position of the start of the execution of the torque vectoring control. At the time t22, the mode of setting the target torque of the front wheel driving motor 11F, the left rear wheel driving motor 11LR, and the right rear wheel driving motor 11RR is restored to the normal mode from the output limited mode.

Thus, during a period from the time t21 of the detection of the curve to the time t22 of the arrival at the position of the start of the execution of the torque vectoring control, the driving torque and the regenerative torque of the left rear wheel driving motor 11LR and the right rear wheel driving motor 11RR are limited to the rated output or smaller. This allows for suppression of a temperature rise in the left rear wheel driving motor 11LR. Hence, it is possible to start the execution of the torque vectoring control, while maintaining the margin for the temperature at which the output of the left rear wheel driving motor 11LR is possibly lowered. After the time t22, the torque vectoring control is started, with the left rear wheel driving motor 11LR at a relatively low temperature. Hence, it is possible to delay the time of an arrival at a temperature at which the output of the left rear wheel driving motor 11LR is possibly lowered, making it possible to prevent lowered performance of the left rear wheel driving motor 11LR while passing through the curve.

3-4. Effects

As described, the control apparatus 50 for the vehicle in the third embodiment of the disclosure is applied to the vehicle 1A including the left rear wheel driving motor 11LR and the right rear wheel driving motor 11RR that are independent on the left and right rear wheels. In the case with a curve present ahead in the direction of travel of the vehicle 1A and where the torque vectoring control is carried out, the control apparatus 50 determines whether or not the estimated driving torque of the left rear wheel driving motor 11LR or the right rear wheel driving motor 11RR becomes equal to or larger than the rated output torque. Moreover, in the case where the estimated driving torque of the left rear wheel driving motor 11LR or the right rear wheel driving motor 11RR becomes equal to or larger than the rated output torque during the execution of the torque vectoring control, the control apparatus 50 limits the output torque of both the left rear wheel driving motor 11LR and the right rear wheel driving motor 11RR to the rated output torque or smaller until the start of the execution of the torque vectoring control. This leads to the suppression of the temperature rise in the left rear wheel driving motor 11LR or the right rear wheel driving motor 11RR while the vehicle 1A passes through the curve, making it possible to lower the peak of the temperature of the left rear wheel driving motor 11LR or the right rear wheel driving motor 11RR while passing through the curve. Hence, it is possible to reduce the possibility of the lowered output of the left rear wheel driving motor 11LR or the right rear wheel driving motor 11RR while the vehicle 1A passes through the curve, causing lowered stability of the vehicle 1A.

In the third embodiment described above, the example of the vehicle 1A is given in which the single front wheel driving motor 11F is provided for the front wheels, and the left rear wheel driving motor 11LR and the right rear wheel driving motor 11RR are provided horizontally independently for the rear wheels. However, the vehicle 1A to which the control apparatus 50 in this embodiment is applicable is not limited to this example. The control apparatus 50 in this embodiment is also applicable to a vehicle in which two driving motors are provided horizontally independently for the respective front wheels, or a vehicle in which two driving motors are provided horizontally independently for the respective front wheels and two driving motors are provided horizontally independently for the respective rear wheels. In this case, to prevent the torque difference between the left and right driving motors, the outputs of the left and right driving motors for the front wheels may be limited as a pair, and the outputs of the left and right driving motors for the rear wheels may be limited as a pair.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The following embodiments also fall within the scope of the disclosure.

(A) The control apparatus for the vehicle according to the third embodiment in which
  the driving motors include a front wheel driving motor, a left rear wheel driving motor that drives a left rear wheel, and a right rear wheel driving motor that drives a right rear wheel,
  the vehicle is configured to execute, as the output increased state, a torque vectoring control that includes assisting in cornering of the vehicle by adjusting distribution of the driving torque to the left rear wheel and the right rear wheel, and
  on the condition that the one or more processors determine that the torque vectoring control is going to be executed ahead in the direction of travel of the vehicle, the one or more processors are configured to limit the driving torque and the regenerative torque of the left rear wheel driving motor and the right rear wheel driving motor to under the rated output, by lowering a ratio of the driving torque and the regenerative torque to be distributed to the left rear wheel driving motor and the right rear wheel driving motor until a start of execution of the torque vectoring control.

(B) The control apparatus for the vehicle according to the first to the third embodiments, in which
  the driving motors are configured to be subjected to output limitation on the condition that temperatures of the driving motors or temperatures of inverters that control the driving motors reach a predetermined restrictive temperature, and the one or more processors are configured to
predict an amount of heat generation in the driving motors or the inverters in the output increased state, and
limit the driving torque and the regenerative torque of the driving motors to under the rated output until the output increased state occurs, to keep the temperatures of the driving motors or the temperatures of the inverters from reaching the predetermined restrictive temperature in the output increased state.

(C) A control apparatus for a vehicle, the vehicle including driving motors provided for respective wheels different from one another, the driving motors being each configured to output driving torque for the vehicle and output regenerative torque, the control apparatus including:
an output increase prediction unit configured to predict an output increased state in which output torque of any of the driving motors becomes larger than a rated output ahead in a direction of travel of the vehicle; and
an output limiting unit configured to limit, on a condition that the output increased state is predicted, the driving torque and the regenerative torque of any of the driving motors expected to produce an output larger than the rated output in the output increased state, to under the rated output, until the output increased state occurs.

(D) The control apparatus for the vehicle according to the second embodiment, in which the one or more processors are configured to predict the output increased state, on a condition that a curve is present ahead in the direction of travel of the vehicle.

(E) The control apparatus for the vehicle according to the second embodiment, in which
the driving motors include a front wheel driving motor and a rear wheel driving motor, the front wheel driving motor being configured to drive one or more front wheels, and the rear wheel driving motor being configured to drive one or more rear wheels, and
the one or more processors are configured to
predict the output increased state, on the condition that the curve is present in the direction of travel of the vehicle, and
limit the driving torque and the regenerative torque of the rear wheel driving motor to under the rated output until the output increased state occurs by lowering a ratio of the regenerative torque to be distributed to the rear wheel driving motor.

The processor 51 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 51. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 51 illustrated in FIG. 2.

The invention claimed is:

1. A control apparatus for a vehicle, the vehicle including driving motors provided for respective wheels different from one another, the driving motors being each configured to output driving torque for the vehicle and output regenerative torque, the control apparatus comprising:
one or more processors; and one or more memories communicably coupled to the one or more processors,
wherein the one or more processors are configured to:
predict that the vehicle is entering an output increased state ahead in a direction of travel of the vehicle, the output increased state causing output torque of any of the driving motors to be larger than a rated output;
in response to predicting that the vehicle is entering the output increased state, limit the driving torque and the regenerative torque of a relevant one of the driving motors, which is expected to exceed the rated output in the output increased state, to a value below the rated output; and
in response to determining that the vehicle has entered the output increased state after limiting the driving torque and the regenerative torque of the relevant one of the driving motors, control the driving torque and the regenerative torque of the relevant one of the driving motors to exceed the rated output while the vehicle remains in the output increased state.

2. The control apparatus for the vehicle according to claim 1, wherein
the one or more processors are configured to predict the output increased state, on a condition that an uphill road is present ahead in the direction of travel of the vehicle.

3. The control apparatus for the vehicle according to claim 2, wherein
the driving motors include a front wheel driving motor and a rear wheel driving motor, the front wheel driving motor being configured to drive one or more front wheels, and the rear wheel driving motor being configured to drive one or more rear wheels, and
the one or more processors are configured to
predict the output increased state, on the condition that the uphill road is present in the direction of travel of the vehicle, and
limit the driving torque and the regenerative torque of the rear wheel driving motor to under the rated output until the output increased state occurs by lowering a ratio of the driving torque and the regenerative torque to be distributed to the rear wheel driving motor.

4. The control apparatus for the vehicle according to claim 3, wherein
the one or more processors are configured to
acquire data regarding a gradient of the uphill road, and on a basis of the data regarding the gradient, set an upper limit value in limiting the driving torque and the regenerative torque of the rear wheel driving motor.

5. The control apparatus for the vehicle according to claim 1, wherein the one or more processors are further configured to:
determine a road shape data of a road ahead in the direction of travel of the vehicle based on a road shape detected by a surrounding environment sensor provided in the vehicle, the road shape data including data regarding a gradient of the road; and
perform prediction that the vehicle is entering the output increased state based on the road shape data.

6. The control apparatus for the vehicle according to claim 5, wherein the one or more processors are further configured to:
  determine whether an uphill road is present ahead in the direction of travel of the vehicle based on the road shape data, the uphill road having a gradient greater than a first threshold and a length equal to or greater than a second threshold; and
  in response to determining that the uphill road is present ahead in the direction of travel of the vehicle, perform the prediction that the vehicle is entering the output increased state before the vehicle reaches the uphill road.

7. The control apparatus for the vehicle according to claim 1, wherein the one or more processors are further configured to:
  determine a positional data regarding the vehicle based on information acquired from a GNSS sensor provided in the vehicle;
  determine a road shape data of a road ahead in the direction of travel of the vehicle based on the positional data and a map information, the road shape data including data regarding a gradient of the road; and
  perform prediction that the vehicle is entering the output increased state based on the road shape data.

8. The control apparatus for the vehicle according to claim 7, wherein the one or more processors are further configured to:
  determine whether an uphill road is present ahead in the direction of travel of the vehicle based on the road shape data, the uphill road having a gradient greater than a first threshold and a length equal to or greater than a second threshold; and
  in response to determining that the uphill road is present ahead in the direction of travel of the vehicle, perform the prediction that the vehicle is entering the output increased state before the vehicle reaches the uphill road.

9. The control apparatus for the vehicle according to claim 1, wherein the one or more processors are further configured to:
  determine a road shape data of a road ahead in the direction of travel of the vehicle based on a road shape detected by a surrounding environment sensor provided in the vehicle, the road shape data including data regarding a radius of curvature of the road; and
  perform prediction that the vehicle is entering the output increased state based on the road shape data.

10. The control apparatus for the vehicle according to claim 9, wherein the one or more processors are further configured to:
  determine whether a curve is present ahead in the direction of travel of the vehicle based on the road shape data, the curve having a radius of curvature equal to or less than a first threshold and a length equal to or greater than a second threshold; and
  in response to determining that the curve is present ahead in the direction of travel of the vehicle, perform the prediction that the vehicle is entering the output increased state before the vehicle reaches the curve.

11. The control apparatus for the vehicle according to claim 1, wherein the one or more processors are further configured to:
  determine a positional data regarding the vehicle based on information acquired from a GNSS sensor provided in the vehicle;
  determine a road shape data of a road ahead in the direction of travel of the vehicle based on the positional data and a map information, the road shape data including data regarding a radius of curvature of the road; and
  perform prediction that the vehicle is entering the output increased state based on the road shape data.

12. The control apparatus for the vehicle according to claim 11, wherein the one or more processors are further configured to:
  determine whether a curve is present ahead in the direction of travel of the vehicle based on the road shape data, the curve having a radius of curvature equal to or less than a first threshold and a length equal to or greater than a second threshold; and
  in response to determining that the curve is present ahead in the direction of travel of the vehicle, perform the prediction that the vehicle is entering the output increased state before the vehicle reaches the curve.

13. A non-transitory computer-readable recording medium containing a program applicable to a control apparatus for a vehicle, the vehicle including driving motors provided for respective wheels different from one another, the driving motors being each configured to output driving torque for the vehicle and output regenerative torque,
  the program causing, when executed by one or more processors, the one or more processors to implement processing, the processing comprising:
  predicting that the vehicle is entering an output increased state ahead in a direction of travel of the vehicle, the output increased state causing output torque of any of the driving motors to be larger than a rated output;
  in response to predicting that the vehicle is entering the output increased state is predicted, limiting the driving torque and the regenerative torque of a relevant one of the driving motors, which is expected to exceed the rated output in the output increased state, to a value below the rated output; and
  in response to determining that the vehicle has entered the output increased state after limiting the driving torque and the regenerative torque of the relevant one of the driving motors, controlling the driving torque and the regenerative torque of the relevant one of the driving motors to exceed the rated output while the vehicle remains in the output increased state.

* * * * *